(12) United States Patent
Donlon et al.

(10) Patent No.: US 12,534,761 B2
(45) Date of Patent: Jan. 27, 2026

(54) METHOD OF USING FOXO3A POLYMORPHISMS AND HAPLOTYPES TO PREDICT AND PROMOTE HEALTHY AGING AND LONGEVITY

(71) Applicants: Timothy Atchison Donlon, Honolulu, HI (US); Bradley John Wilcox, Honolulu, HI (US); J. David Curb, Honolulu, HI (US)

(72) Inventors: Timothy Atchison Donlon, Honolulu, HI (US); Bradley John Wilcox, Honolulu, HI (US); J. David Curb, Honolulu, HI (US)

(73) Assignee: Kuakini Medical Center, Honolulu, HI (US)

( * ) Notice: Subject to any disclaimer, the term of this patent is extended or adjusted under 35 U.S.C. 154(b) by 0 days.

(21) Appl. No.: 14/822,873

(22) Filed: Aug. 10, 2015

(65) Prior Publication Data

US 2015/0337383 A1 Nov. 26, 2015

Related U.S. Application Data

(62) Division of application No. 13/058,179, filed as application No. PCT/US2009/053307 on Aug. 10, 2009, now abandoned.

(60) Provisional application No. 61/087,722, filed on Aug. 10, 2008.

(51) Int. Cl.
| C12Q 1/68 | (2018.01) |
| C12P 19/34 | (2006.01) |
| C12Q 1/6876 | (2018.01) |
| C12Q 1/6883 | (2018.01) |

(52) U.S. Cl.
CPC ......... *C12Q 1/6876* (2013.01); *C12Q 1/6883* (2013.01); *C12Q 2535/125* (2013.01); *C12Q 2600/106* (2013.01); *C12Q 2600/156* (2013.01); *C12Q 2600/158* (2013.01); *C12Q 2600/172* (2013.01)

(58) Field of Classification Search
CPC ............ C12Q 1/6886; C12Q 2600/106; C12Q 2600/118; C12Q 2600/158
See application file for complete search history.

(56) References Cited

U.S. PATENT DOCUMENTS

| 4,656,127 A | 4/1987 | Mundy |
| 4,998,617 A | 3/1991 | Ladd, Jr |
| 5,459,039 A | 10/1995 | Modrich |
| 5,593,826 A | 1/1997 | Fung |
| 5,693,473 A | 12/1997 | Shattuck-Eidens |
| 5,709,999 A | 1/1998 | Shattuck-Eidens |
| 5,710,001 A | 1/1998 | Skolnick |
| 5,747,282 A | 5/1998 | Skolnick |
| 5,753,441 A | 5/1998 | Skolnick |
| 5,837,495 A | 11/1998 | Tavtigian |
| 6,033,857 A | 3/2000 | Tavtigian |
| 6,673,546 B2 | 1/2004 | Perls |
| 7,622,271 B2 | 11/2009 | Kennedy |
| 2004/0121407 A1 | 6/2004 | Distefano |
| 2006/0003359 A1 | 1/2006 | Feinberg |
| 2006/0068414 A1 | 3/2006 | Kennedy |
| 2006/0069049 A1 | 3/2006 | Goldberg |
| 2006/0272039 A1 | 11/2006 | Tissenbaum |
| 2007/0105109 A1 | 5/2007 | Geesaman |
| 2007/0118398 A1 | 5/2007 | Perls |

FOREIGN PATENT DOCUMENTS

| EP | 0699754 B1 | 10/2001 |
| FR | 2650840 B1 | 11/1989 |
| JP | 2005168463 | 6/2005 |
| JP | 2006517784 A | 9/2006 |
| JP | 2006520203 A | 9/2006 |
| WO | 92/15712 A1 | 9/1992 |
| WO | 94/16101 | 7/1994 |
| WO | 2005/007687 A1 | 1/2005 |

OTHER PUBLICATIONS

Sunters A. et al. The Journal of Biological Chemistry. vol. 278, No. 50, Issue of Dec. 12, pp. 49795-49805, 2003.*
Krol J. et al. Mol Cancer Ther 2007;6(12). Dec. 2007.*
Hui, R. C.-Y., et al. Mol Cancer Ther 2008;7(3):670-8. (Year: 2008).*
Supplementary European Search Report dat3e Oct. 5, 2012.
European Search Opinion dated Oct. 5, 2012.
Reply to Written Opinion prepared by the EPO filed Nov. 28, 2012.
Amended Claims filed after receipt of (European) search report filed Nov. 28, 2012.
Herskind, A. M. et al., "The heritability of human longevity: a population-based study of 2872 Danish twin pairs born 1870-1900," Hum Genet (1996) vol. 97, pp. 319-323, Springer-Verlag.
Yashin, A. I., et al., "Half of the Variation in Susceptibility to Mortality is Genetic: Findings from Swedish Twin Survival Data," Behavior Genetics (1999) vol. 29, No. 1, pp. 11-19, Plenum Publishing Corporation.
Christensen, K. et al., "The quest for genetic determinants of human longevity: challenges and insights," Nature Review Genetics (Jun. 2006) vol. 7, pp. 436-448, Nature Publishing Group.

(Continued)

*Primary Examiner* — Stephen T Kapushoc
(74) *Attorney, Agent, or Firm* — Ostrager Chong Flaherty & Broitman P.C.

(57) ABSTRACT

The invention provides methods and compositions relating to identification and use of genetic information from the FOXO3A gene that can be used for determining and increasing an individual's likelihood of longevity and of retaining physical and cognitive function during aging, and for determining and decreasing an individual's likelihood of developing a cardiovascular-, metabolic- or age-related disease, including coronary artery (heart) disease, stroke, cancer, chronic pulmonary disease, diabetes, Parkinson's disease and dementia.

10 Claims, 1 Drawing Sheet
Specification includes a Sequence Listing.

(56) References Cited

OTHER PUBLICATIONS

Willcox, D. C. et al., "Genetic determinants of exceptional human longevity: insights from the Okinawa Centenarian Study," AGE (2006) vol. 28, pp. 313-332, Springer.
Bishop, N. A. et al., "Genetic links between diet and lifespan: shared mechanisms from yeast to humans," Nature Review Genetics (Nov. 2007) vol. 8, pp. 835-844, Nature Publishing Group.
Risch, N., et al., "Extreme Discordant Sib Pairs for Mapping Quantitative Trait Loci in Humans," Science (Jun. 16, 1995) vol. 268, pp. 1584-1589.
Gudmundsson, H. et al., "Inheritance of human longevity in Iceland," European Journal of Human Genetics (2000) vol. 8, pp. 743-749, Macmillan Publishers Ltd.
Kerber, R. A., et al., "Familial Excess Longevity in Utah Genealogies," Journal of Gerontology Biological Sciences (2001) vol. 56A, No. 3, pp B130-B139, The Gerontological Society of America.
Perls, T. T., et al., "Life-long sustained mortality advantage of siblings of centenarians," PNAS (Jun. 11, 2002) vol. 99, No. 12, pp. 8442-8447.
Willcox, B. J., et al., "Siblings of Okinawan Centenarians Share Lifelong Mortality Advantages," Journal of Gerontology Biological Sciences (2006) vol. 61A, No. 4, pp. 345-354, The Gerontological Society of America.
Partridge, Linda, "Some highlights of research on aging with invertebrates, 2006-2007," Aging Cell (Oct. 2007) vol. 6, Issue 5, pp. 595-598 (Article Abstract).
Ghazi, A. et al., "Regulation of Caenorhabditis elegans lifespan by a proteasomal E3 ligase complex," PNAS (Apr. 3, 2007) vol. 104, No. 14, pp. 5947-5952.
Bartke, Andrzej, "New findings in gene knockout, mutant and transgenic mice," Experimental Gerontology (available online Nov. 28, 2007) vol. 43, pp. 11-14.
Lin, K. et al., "daf-16: An HNF-3/forkhead family member that can function to double the life-span of Caenorhabditis elegans," Science (Nov. 14, 1997) vol. 278, pp. 1319-1322.
Brunet, A. et al., "Stress-dependent regulation of FOXO transcription factors by the SIRT1 Deactylase," Science (Mar. 26, 2004) vol. 303, pp. 2011-2015.
Kenyon, Cynthia, "Enrichment of regulatory motifs upstream of predicted DAF-16 targets," Nature Genetics (Apr. 2006) vol. 38, No. 4., pp. 397-398.
Van Der Horst, Armando, et al., "Stressing the role of FoxO proteins in lifespan and disease," Nature Reviews Molecular Cell Biology (Jun. 2007) vol. 8, pp. 440-450.
Russell, Steven J., et al., "Endocrine regulation of ageing," Nature Reviews Molecular Cell Biology (Sep. 2007) vol. 8, pp. 681-691.
Sauve, Anthony A., et al., "The Biochemistry of Sirtuins," The Annual Review of Biochemistry (2006) vol. 75, pp. 435-465.
Tissenbaum, Heidi A., et al., "Increased dosage of a sir-2 gene extends lifespan in Caenorhabditis elegans," Nature (Mar. 8, 2001) vol. 410, pp. 227-230.
Bluher, Matthias, et al., "Extended Longevity in Mice Lacking the Insulin Receptor in Adipose Tissue," Science (Jan. 24, 2003) vol. 299, pp. 572-574.
White, Morris F., "Insulin Signaling in Health and Disease," Science (Dec. 5, 2003) vol. 302, pp. 1710-1711.
Curran, Sean P., et al., "Lifespan Regulation by Evolutionarily Conserved Genes Essential for Viability," PLOS Genetics (Apr. 2007) vol. 3, Iss. 4, pp. 479-487.
Greer, Eric L., et al., "An AMPK-FOXO Pathway Mediates Longevity Induced by a Novel Method of Dietary Restriction in C. elegans," Current Biology (Oct. 9, 2007) vol. 17, No. 19, pp. 1646-1656.
Berdichevsky, Ala, et al., "C. elegans SIR-2.1 Interacts with 14-3-3 Proteins to Activate DAF-16 and Extend Life Span," Cell (Jun. 16, 2006) vol. 125, pp. 1165-1177.
Boehm, Michelle, et al., "A Developmental Timing MicroRNA and Its Target Regulate Life Span in C. elegans," Science (Dec. 23, 2005) vol. 310, pp. 1954-1957.

Hsu, Ao-Lin, et al., "Regulation of Aging and Age-Related Disease by DAF-16 and Heat-Shock Factor," Science (May 16, 2003) vol. 300, pp. 1142-1145.
Murphy, Coleen T., "The search for DAF-16/FOXO transcriptional targets: Approaches and discoveries," Experimental Gerontology (Aug. 24, 2006) vol. 41, pp. 910-921.
Wang, Meng C., et al., "JNK Extends Life Span and Limits Growth by Antagonizing Cellular and Organism-Wide Responses to Insulin Signaling," Cell (Apr. 8, 2005) vol. 121, pp. 115-125.
Harman, Denham, "Aging: A Theory Based on Free Radical and Radiation Chemistry," Journal of Gerontology (1956) vol. 11, pp. 298-300.
Beckman, Kenneth B., "The Free Radical Theory of Aging Matures," Physiological Reviews (Apr. 1998) vol. 78, No. 2, pp. 547-581.
Bonafe, Massimiliano, et al., "Polymorphic Variants of Insulin-Like Growth Factor I (Igf-I) Receptor and Phosphoinositide 3-Kinase Genes Affect IGF-I Plasma Levels and Human Longevity: Cues for an Evolutionarily Conserved Mechanism of Life Span Control," The Journal of Clinical Endocrinology & Metabolism (2003) vol. 88, No. 7, pp. 3299-3304.
Arai, Yasumichi, et al., "Serum Insulin-like Growth Factor-1 in Centenarians: Implications of IGF-1 as a Rapid Turnover Protein," Journal of Gerontology (2001) vol. 56A, No. 2, pp M79-M82.
Suh, Yousin, et al., "Functionally significant insulin-like growth factor I receptor mutations in centenarians," Proceedings of the National Academy of Sciences (Mar. 4, 2008) vol. 105, No. 9, pp. 3438-3442.
Kuningas, Maris, et al., "Haplotypes in the human Foxo1a and Foxo3a genes; impact on disease and mortality at old age," European Journal of Human Genetics (2007) vol. 15, pp. 294-301.
Lunetta, Kathryn L., et al., "Genetic correlates of longevity and selected age-related phenotypes: a genome-wide association study in the Framingham Study," BMC Medical Genetics (Sep. 19, 2007) vol. 8, Suppl 1, S13.
Nebel, Almut, et al., "No association between microsomal triglyceride transfer protein (MTP) haplotype and longevity in humans," Proceedings of the National Academy of Sciences (May 31, 2005) vol. 102, No. 22 pp. 7906-7909.
Kojima, Toshio, et al., "Association analysis between longevity in the Japanese population and polymorphic variants of genes involved in insulin and insulin-like growth factor 1 signaling pathways," Experimental Gerontology (2004) vol. 39, pp. 1595-1598.
Willcox, Bradley J., et al., "Midlife Risk Factors and Healthy Survival in Men," The Journal of the American Medical Association (Nov. 15, 2006) vol. 296, No. 19 pp. 2343-2350.
Kramarow, Ellen, et al., "Trends In The Health Of Older Americans, 1970-2005," Health Affairs (2007) vol. 26, No. 5 pp. 1417-1425.
Evert, Jessica, et al., "Morbidity Profiles of Centenarians: Survivors, Delayers, and Escapers," Journal of Gerontology (2003) vol. 58A, No. 3 pp. 232-237.
Bernstein, Adam M., et al., "First Autopsy Study of an Okinawan Centenarian: Absence of Many Age-Related Diseases," Journal of Gerontology (2004) vol. 59A, No. 11 pp. 1195-1199.
Willcox, D. Craig, et al., "Aging Gracefully: A Retrospective Analysis of Functional Status in Okinawan Centenarians," The American Journal of Geriatric Psychiatry (Mar. 2007) vol. 15, No. 3 pp. 252-256.
Terry, Dellara F., et al., "Cardiovascular Disease Delay in Centenarian Offspring," Journal of Gerontology (2004) vol. 59A, No. 4 pp. 385-389.
Rodriguez, Beatriz L., et al., "The American Diabetes Association and World Health Organization Classifications for Diabetes," Diabetes Care (Jun. 2002) vol. 25, No. 6 pp. 951-955.
Mcneely, Marguerite J., et al., "Type 2 Diabetes Prevalence in Asian Americans," Diabetes Care (Jan. 2004) vol. 27 No. 1 pp. 66-69.
The Examination Committee of Criteria for 'Obesity Disease' in Japan, "New Criteria for 'Obesity Disease' in Japan," Circulation Journal (Nov. 2002) vol. 66 pp. 987-992.
Barthel, Andreas, et al., "FoxO proteins in insulin action and metabolism," Trends in Endocrinology and Metabolism (May/Jun. 2005) vol. 16 No. 4 pp. 183-189.

(56) References Cited

OTHER PUBLICATIONS

Kops, Geert J. P. L., et al., "Forkhead transcription factor FOXO3a protects quiescent cells from oxidative stress," Nature (Sep. 19, 2002) vol. 419 pp. 316-321.

Youngman, Linda D., et al., "Protein oxidation associated with aging is reduced by dietary restriction of protein or calories," Proceedings of the National Academy of Sciences (Oct. 1992) vol. 89 pp. 9112-9116.

Heilbronn, Leonie K., et al., "Effect of 6-Month Calorie Restriction on Biomarkers of Longevity, Metabolic Adaptation, and Oxidative Stress in Overweight Individuals," The Journal of the American Medical Association (Apr. 5, 2006) vol. 295, No. 13 pp. 1539-1548.

Selman, Colin, et al., "Evidence for lifespan extension and delayed age-related biomarkers in insulin receptor substrate 1 null mice," The FASEB Journal (Mar. 2008) vol. 22 pp. 807-818.

Murphy, Coleen T., et al., "Genes that act downstream of DAF-16 to influence the lifespan of Caenorhabditis elegans," Nature (Jul. 17, 2003) vol. 424 pp. 277-284.

Kuningas, Maris, et al., "SIRT1 Gene, Age-Related Diseases, and Mortality: The Leiden 85-Plus Study," Journal of Gerontology (2007) vol. 62A, No. 9 pp. 960-965.

Advisory Panel on Exceptional Longevity, "Report of the National Institute on Aging Advisory Panel on Exceptional Longevity," National Institute on Aging (Spring 2001) pp. 1-46.

Arias, Elizabeth, "United States Life Tables, 2003," National Vital Statistics Reports, National Center for Health Statistics (Published: Apr. 19, 2006, Revised: Mar. 28, 2007) vol. 54, No. 14 pp. 1-40.

Database of Single Nucleotide Polymorphisms ("dbSNP Database"), National Center for Biotechnology Information, National Library of Medicine, printout of web page from the dbSNP Database (https://www.ncbi.nlm.nih.gov/snp/?term=foxo3) showing Items 1 to 20 of 48895 of a search for SNP foxo3, printed on Mar. 28, 2025, 9 pages.

Invitrogen (TM) 100 bp DNA Ladder, ThermoFisher Scientific, https://www.thermofisher.com/order/catalog/product/15628019, printed on Mar. 28, 2025, 7 pages.

Tromans, A., GenBank AL391646.12, "Human DNA sequence from clone RP11-69764 on chromosome 6, complete sequence"; PRI 24-Jan. 2013 (On Feb. 15, 2001, this sequence version replaced AL391646.11), 42 pages.

Hirakawa, Mika et al., "JSNP: a database of common gene variations in the Japanese population", Nucleic Acids Research, 2002, vol. 30, No. 1. pp. 158-162.

Hsu, Ih-Chang et al., "Detection of DNA point mutations with DNA mismatch repair enzymes", Carcinogenesis, vol. 15, No. 8 (1994), pp. 1657-1662.

Kornher, J. Stephen and Livak, Kenneth J., "Mutation detection using nucleotide analogs that alter electrophoretic mobility", Nucleic Acids Research, vol. 17, No. 19 (1989), pp. 7779-7784.

Tobe, Vincent O et al., "Single-well genotyping of diallelic sequence variations by a two-color ELISA based oligonucleotide ligation assay", Nucleic Acids Reseach, vol. 24, No. 19 (1996), pp. 3728-3732.

Ugozzoli, Luis et al., Detection of Specific Alleles by Using Allele-Specific Primer Extension Followed by Capture on Solid Support, GATA 9(4): 107-112. 1992.

Cotton, R.G.H., "Current methods of mutation detection", Mutation Research, 285 (1993) 125-144.

National Center for Biotechnology Information, "FOXO3 forkhead box 03 [ Homo sapiens (human) ], Gene ID: 2309, updated on 16-Mar. 2025", printed from https://www.ncbi.nlm.nih.gov/gene/2309 on Mar. 26, 2025, 20 pages.

UniProt: the Universal Protein Resource (www.uniprot.org), "O43524 • FOXO3_HUMAN—Forkhead box protein O3", printed from https://www.uniprot.org/uniprotkb/O43524/entry on Mar. 26, 2025, 9 pages.

Metzker, Michael, "Emerging Technologies in DNA Sequencing," Genome Research, 15:1767-1776, Cold Spring Harbor Laboratory Press, 2005.

Schmalzing, Dieter, "Recent Developments in DNA Sequencing By Capillary and Microdevice Electrophoresis," Electrophoresis 1999, 20, 3066-3077, Wiley-VCH Verlag GmbH (1999).

Yang, Qing, "Trends in Capillary Electrophoresis: 1997", Journal of Chromatographic Science, vol. 35, Aug. 1997.

Barany, Francis, "Genetic disease detection and DNA amplification using cloned thermostable ligase", Proc. Natl. Acad. Sci. USA, vol. 88, Jan. 1991, pp. 189-193.

Bartke, Andrzej, "Impact of reduced insulin-like growth factor-1/insulin signaling on aging in mammals: novel findings", Aging Cell, vol. 7 (2008), pp. 285-290.

Burchfiel, Cecil M. et al., "Distribution and Correlates of Lipids and Lipoprotiens in Elderly Japanese-American Men: The Honolulu Heart Program", Arteriosclerosis, Thrombosis & Vascular Biology, Nov. 1996, vol. 16 (11), pp. 1356-1364.

Castrillon, Diego H., et al., "Suppression of Ovarian Follicle Activation in Mice by the Transcription Factor Foxo3a" www.sciencemag.org, Science, vol. 301, Jul. 11, 2003, pp. 215-218.

Conover, Cheryl A. and Bale, Laurie K., "Loss of pregnancy-associated plasma protein A extends lifespan in mice", Aging Cell, vol. 6 (2007), pp. 727-729.

Cotton, Richard G.H. et al., "Reactivity of cytosine and thymine in single-base-pair mismatches with hyroxylamine and osmium tetroxide and its application to the study of mutations", Proc. Natl. Acad. Sci. USA, vol. 85, Jun. 1988, pp. 4397-4401.

Cronin, Maureen T. et al., "Cystic Fibrosis Mutation Detection by Hybridization to Light-Generated DNA Probe Arrays", Human Mutation, 7:244-255 (1996).

Curb, David, J .et al., "Peripheral Artery Disease and Cardiovascular Risk Factors in the Elderly The Honolulu Heart Program", Arteriosclerosis, Thrombosis & Vascular Biology, vol. 16, No. 12, Dec. 1996, pp. 1495-1500.

Fujimoto, Wilfred Y. et al., "Susceptibility to Development of Central Adiposity Among Populations", Obesity Research, vol. 3, Suppl. 2, 2 Sep. 1995, p. 179s-186s.

Fusco, Domenico et al., "Effects of antioxidant supplementation on the aging process", Clinical Interventions in Aging 2007:2(3), pp. 377-387.

Giannakou Maria E et al., "Dynamics of the action of dFOXO on adult mortality in Drosophila", Aging Cell (2007) 6, pp. 429-438.

Gibbs, Richard A. et al., "Detection of single DNA base differences by competitive oligonucleotide priming", Nucleic Acids Research vol. 17, No. 7 (1989), pp. 2437-2448.

Griffin, H.G. and Griffin A.M., "Dna Sequencing Recent Innovations and Future Trends", Applied Biochemistry and Biotechnology, vol. 38 (1993), pp. 147-159.

Guatelli, John C et al., "Isothermal, in vitro amplification of nucleic acids by a multienzyme reaction modeled after retroviral replication", Proc. Natl. Acad. Sci. USA, vol. 87, Mar. 1990, pp. 1874-1878.

Hayashi, Kenshi, "Pcr-Sscp: A Method for Detection of Mutations", Genetic Analysis: Biomolecular Engineering, vol. 9, Issue 3 (1992), pp. 73-79.

Kagan, Abraham, "Stroke", The Honolulu Heart Program: An Epidemiological Study of Coronary Heart Disease and Stroke (1996), pp. 111-126, Harwood Academic Publishers.

Keen, Jeffrey, et al., "Rapid detection of single base mismatches as heteroduplexes on Hydrolink gels", Trends Genetics, vol. 7 (Jan. 1991), p. 5.

Kornher, J. Stephen and Livak, Kenneth J., "Mutation detection using nucleotide analogs that alter electrophorectic mobility", Nucleic Acids Research, vol. 17, No. 19 (1989), pp. 7779-7784.

Kuppuswamy, Mohan N et al., "Single nucleotide primer extension to detect genetic diseases: Experimental application to hemophilia B (factor IX) and cystic fibrosis genes", Proc. Natl. Acad. Sci. USA, vol. 88, Feb. 1991, pp. 1143-1147.

Kwoh D.Y et al., "Transcription-based amplification system and detection of amplified human immunodeficiency virus type 1 with a bead-based sandwich hybridization format", Proc. Natl. Acad. Sci. USA, vol. 86, Feb. 1989, pp. 1173-1177.

Landegren, Ulf et al., "A Ligase-Mediated Gene Detection Technique", Science, vol. 241 (1988), pp. 1077-1080.

(56) References Cited

OTHER PUBLICATIONS

Lizardi, Paul et al., "Exponential Amplification of Recombinant-RNA Hybridization Probes", Bio/Technology, vol. 6, Oct. 1988, pp. 1197-1202.
Maxam, Allan M. and Gilbert, William, "A new method for sequencing DNA", Proc. Natl. Acad. Sci. USA, vol. 74, No. 2, Feb. 1977, pp. 560-564.
Myers, Richard M et al., "Detection of single base substitutions by ribonuclease cleavage at mismatches in Rna: Dna duplexes" Science, vol. 230, Dec. 13, 1985, pp. 1242-1246.
Myers, Richard M et al., "Detection of single base substitutions in total genomic DNA", Nature, vol. 313, Feb. 7, 1985, pp. 495-498.
Nickerson, Deborah A et al., "Automated DNA diagnostics using an ELISA-based oligonucleotide ligation assay", Proc. Natl. Acad. Sci. USA, vol. 87, Nov. 1990, pp. 8923-8927.
Nordyke Eleanor C et al., "A profile of Hawaii's elderly population", Papers of the East-West Population Institute, No. 91, Aug. 1984, title page, copyright p. and pp. 11-15.
Nyren, Pal et al., "Solid Phase DNA Minisequencing by an Enzymatic Luminometric Inorganic Pyrophosphate Detection Assay", Analytical Biochemistry 208 (1993), pp. 171-175.
Orita, Masato et al., "Detection of polymorphisms of human DNA by gel electrophoresis as a single-strand conformation polymorphisms" Proc. Natl. Acad. Sci. USA, vol. 86, Apr. 1989, pp. 2766-2770.
Prezant, Toni R. and Fischel-Ghodsian, Nathan, "Trapped-Oligonucleotide Incorporation (TONI) Assay, a Simple Method for Screening Point Mutations", Human Mutation 1:159-164 (1992).
Prosser, Jane, "Detecting single-base mutations", Trends in Biotechnology, vol. 11, Jun. 1993, pp. 238-246.
Rodriguez, B.L. and Curb, J.D., "Cardiovascular Risk Factors in the Elderly: The Honolulu Heart Program", Cardiovascular Risk Factors, vol. 8, No. 3, pp. 99-103.
Roest, Pauline A.M et al., "Protien truncation test (PTT) for rapid detection of translation-terminating mutations", Human Molecular Genetics, 1993, vol. 3, No. 10, pp. 1719-1721.
Rosenbaum, Volker and Reisner, Detlev, "Temperature-gradient gel electrophoresis, Thermodynamic analysis of nucleic acids and proteins in purified form and in cellular extracts", Biophysical Chemistry, 26 (1987), pp. 235-246.
Saiki, Randall K et al., "Analysis of enzymatically amplified B-globin and HLA-DQa DNA with allele-specific oligonucleotide probes", Nature, vol. 324, Nov. 13, 1986, pp. 163-166.
Saiki, Randall K et al., "Genetic analysis of amplified DNA with immobilized sequence-specific oligonucleotide probes", Proc. Natl. Acad. Sci. USA, vol. 86, Aug. 1989, pp. 6230-6234.
Saleeba, Jennifer A. and Cotton, Richard G.H., "Chemical Cleavage of Mismatch to Detect Mutations", Methods in Enzymology, vol. 217, pp. 286-295.
Sanger F et al., "DNA sequencing with chain-terminating inhibitors", Proc. Natl. Acad. Sci. USA, vol. 74, No. 12, Dec. 1977, pp. 5463-5467.
Sherry, S.T et al., "dbSNP: the NCBI database of genetic variation", Nucleic Acids Research, 2001, vol. 29, No. 1, pp. 308-311.
Sokolov, Boris P., "Primer extension technique for the detection of single nucleotide in genomic DNA", Nucleic Acids Research, vol. 18, No. 12, p. 3671.
Syvanen, Ann-Christine et al., "A Primer-Guided Nucleotide Incorporation Assay in the Genotyping of Apolipoprotein E", Genomics 8 (1990), pp. 684-692.
Syvanen, Ann-Christine et al., "Identification of Individuals by Analysis of Biallelic DNA Markers, Using PCR and Solid-Phase Minisequencing", Am. J. Hum. Genet., 52:46-59, 1993.
Tarlow, Joanna K et al., "Severity of Alopecia Areata Is Associated with a Polymorphism in the Interleukin-1 Receptor Antagonist Gene", The Journal of Investigative Dermatology, vol. 103, No. 3, Sep. 1994, pp. 387-390.
White, Lon et al., "Prevalence of Dementia in Older Japanese-American Men in Hawaii The Honolulu-Asia Aging Study", JAMA, Sep. 25, 1996, vol. 276, No. 12, pp. 955-960.
Worth, Robert M. and Kagan, Abraham, "Ascertainment of Men of Japanese Ancestry in Hawaii Through World War II Selective Service Registration", J. Chron. Dis. 1970, vol. 23, pp. 389-397.
GASPARINI p et al., "Restriction site generating-polymerase chain reaction (RG-PCR) for the probeless detection of hidden genetic variation: application to the study of some common cystic fibrosis mutations", Molecular and Cellular Probes (1992) 6, pp. 1-7.
PCT International Search Report for PCT Application No. PCT/US2009/053307 dated Apr. 6, 2010.
PCT Written Opinion of the International Searching Authority for PCT Application No. PCT/US2009/053307 dated Apr. 6, 2010.
Kim, Jae-Ryong et al. "polymorphisms in F0X0 gene family and association analysis with BMI", Obesity, Feb. 2006, vol. 14, No. 2, pp. 188-193 (see p. 192).
Kuningas, Maris et al., "Haplotypes in the human Foxo1a and Foxo3a genes: impact on disease and mortality at oldage", Eur. J. Hum. Genet., Jan. 2007, vol. 15, pp. 294-301.
Lunetta, Kathryn L. et al., "Genetic correlates of longevity and selected age-related phenotypes: a genome-wide association study in the Framingham study" BMC Medical genetics, Sep. 19, 2007, vol. 8, (suppl 1), p. S13.
Patent Examination Report No. 1, Australia Patent Application No. 2009282172, Aug. 26, 2014.
Patent Examination Report 2, Australia Patent Application No. 2009282172, May 17, 2016.
EPO Examination Report, Eruopean Patent Office Application No. 09807138.4 dated Apr. 24, 2013.
EPO Search Report, European Patent Office Application No. 09807138.4 dated May 10, 2012.
Purdom, Sally, "p66SHC: at the crossroad of oxidative stress and the genetics of aging", TRENDS in Molecular Medicine, vol. 9, No. 5, May 2003.
Melov, Simon, "Extension of Life-Span with Superoxide Dismutase/Catalase Mimetics", www.sciencemag.org, Science vol. 289, Sep. 1, 2000.
Vijg, Jan, "Genetics of Longevity and Aging", Annu Rev Med 2005 56:193-212.
Willcox J. Bradley, "F0X03A Genotype is strongly associated with human longevity", PNAS Sep. 16, 2008, vol. 105, No. 37, 13987-13992.
Flachsbart, Friederike, Association of F0X03A variation with human longevity confirmed in German centenarians, PNAS Feb. 24, 2009, vol. 106, No. 8, 2700-2705.
The Korean Intellectual Property Office Notice of Request for Submission of Argument mailed Nov. 10, 2015 in Application No. 10-2011-7005559.
KOPS, Geert J.P.L., "Forkhead transcription factor FOX03a protects quiescent cells from oxidative stress", Nature 419, 6904, Sep. 19, 2002, 316-321, 6-14.
Notification of Reasons for Refusal, Japanese Patent Office, Application No. 2011-523071 dispatched Feb. 25, 2014.
Database dbSNP Short Genetic Variations [online], Submitted SNP (ss) Details:ss98422453, RefSNP (rs#): rs2802292, http://www.ncbi.nlm.nih.gov/projects/SNP/snp_ss.cgi?subsnp_id=98422453, First entry to dbSNP: Mar. 31, 2008, Retrived on Feb. 14, 2014.
Database dbSNP Short Genetic Variations [online], Submitted SNP (ss) Details: ss98422470, RefSNP (rs#): rs13217795, http://www.ncbi.nlm.nig.gov/projects/SNP/snp_ss.cgi?subsnp_id=98422470, First entry to dbSNP: Mar. 31, 2008, Retrived on Feb. 14, 2014.
Database dbSNP Short Genetic Variations [online],Submitted SNP (ss) Details: ss98422460, (rs#): rs2764246, http://www.ncbi.nlm.nih.gov/projects/SNP/snp_ss.cgi?subsp_id=98422460, First entry to dbSNP: Mar. 31, 2008, Retrieved on Feb. 14, 2014.
Office Action from Canadian Intellectual Property Office in Application 2,733,597 dated Jan. 14, 2016.
Office Action from Canadian Intellectual Property Office in Application No. 2,733,597 dated Mar. 28, 2017.
GenBank Locus: NM_001455 "Homo sapiens forkhead box O3A (FOXO3A), transcript variant 1, mRNA." Apr. 1, 2007, from www.ncbi.nlm.nih.gov, pp. 1-6.
dbSNP Reference SNP(refSNP) Cluster Report: rs13217795, from www.ncbi.nlm.nih.gov, pp. 1-3 printed on Feb. 25, 2013.

(56) References Cited

OTHER PUBLICATIONS dbSNP Reference SNP(refSNP) Cluster Report: rs2764264, from www.ncbi.nlm.nih.gov, pp. 1-4, printed on Feb. 25, 2013.
dbSNP Reference SNP(refSNP) Cluster Report: rs2802292, from www.ncbi.nlm.nih.gov, pp. 1-4, printed on Feb. 25, 2013.
rs2764264—SNP—NCBI, Summary, Sorted by SNP ID, from www.ncbi.nlm.nih.gov/snp, printed on Feb. 5, 2015, one printed page.
Submitted SNP(ss) Details: ss98422453 (Mar. 31, 2008), from www.ncbi.nlm.nih.gov. 2 printed pages.
Submitted SNP(ss) Report in Submission Format- NCBI Assay Id(ss#): ss44755793, Jul. 19, 2005, two pages printed from www.ncbi.nlm.nih.gov (Year: 2005).
Submitted SNP(ss) Report in Submission Format - NCBI Assay Id(ss#): ss71113896, Apr. 23, 2007, one page printed from www.ncbi.nlm.nih.gov (Year: 2007).
Homo sapiens chromosome 6 genomic contig, reference assembly, 29-Aug. 2006, printed positions 13077481-13143827, 21 pages printed from www.ncbi.nlm.nih.gov (Year: 2006).
Buck, G.A. et al., "Design Strategies and Performance of Custom DNA Sequencing Primers", BioTechniques, 27:528-536 (Sep. 1999).
Hegele, Robert A., "Snp Judgments and Freedom of Association", Arterioscler Thromb Vasc Biol. 2002;22:1058-1061 (Jul. 2002).
Juppner, H., "Functional Properties of the PTH/PTHrP Receptor", Bone, vol. 17, No. 2, Supplement, Aug. 1995, p. 39S-42S.
Kagan A et al. (1974) "Epidemiologic Studies of Coronary Heart Disease and Stroke in Japanese Men Living in Japan, Hawaii and California: Demographic, Physical, Dietary and Biochemical characteristics". J Chronic Dis 1974, vol. 27, pp. 345-364.
Lucenti, Jack, "Gene Association Studies Typically Wrong", The Scientist, Dec. 20, 2004, p. 20.
Millet, B.P. et al., "Development of allele-specific PCR and RT-PCR assays for clustered resistance genes using a potato late blight resistance transgene as a model", Theor Appl Genet (2007) 114:501-513.
Partridge, Linda, "Some highlights of research on aging with invertebrates", Aging Cell (2007) 6, pp. 595-598.
Pennisi, Elizabeth, "A Closer Look at SNPs Suggests Difficulties", Science; Sep. 18, 1998; 281, 5384, pp. 1787-1789.
Perlis, Roy H., et al., "Family-Based Association Study of Lithium-Related and Other Candidate Genes in Bipolar Disorder", Arch Gen Psychiatry, vol. 65, No. 1, pp. 53-61, including pp. 1-70 of Supplementary Online Content.
Teng, Evelyn L. et al., "The Cognitive Abilities Screening Instrument (CASI): A Practical Test for Cross Cultural Epidemiological Studies of Dementia", International Psychogeriatrics, vol. 6, No. 1, 1994, pp. 45-58.
Van Der Luijt, J.T. et al. Rapid Detection of Translation-Terminating Mutations at the Adenomatous Polyposis Coli (APC) Gene by Direct Protein Truncation Test—Genomics 20 (1994), pp. 1-4.
Wall, Jeffrey D. and Pritchard, Jonathan K., "Haplotype Blocks and Linkage Disequilibrium in the Human Genome", Nature Reviews—Genetics, vol. 4 (Aug. 2003), pp. 587-597.

\* cited by examiner

METHOD OF USING FOXO3A POLYMORPHISMS AND HAPLOTYPES TO PREDICT AND PROMOTE HEALTHY AGING AND LONGEVITY

CROSS-REFERENCE TO RELATED APPLICATION

This application is a divisional application of and claims priority to pending, U.S. utility application Ser. No. 13/058,179 filed Apr. 29, 2011, entitled METHOD OF USING FOXO3A POLYMORPHISMS AND HAPLOTYPES TO PREDICT AND PROMOTE HEALTHY AGING AND LONGEVITY, which is the U.S. national phase application of PCT/US09/053307, filed on Aug. 10, 2009, which is in part based on, and claims the benefit of, U.S. Provisional Patent Application No. 61/087,722, filed Aug. 10, 2008, the entire contents of all three applications are incorporated herein by reference.

STATEMENT REGARDING FEDERALLY SPONSORED RESEARCH OR DEVELOPMENT

This invention was made with government support under grant 1 R01 AG027060-01 (Defining the Healthy Aging Phenotype) from the National Institute on Aging. Additional funding was provided by U.S. government support under contract N01-HC-05102 from the National Heart, Lung, and Blood Institute, contract N01-AG-4-2149 and grants 5 U01 AG019349-05 and K08 AG22788-02 from the National Institute on Aging. The U.S. government has certain rights in the invention. Additional support came under grant 2004-0463 from the Hawaii Community Foundation.

FIELD OF INVENTION

The invention relates to a method of using FOXO3A polymorphisms and haplotypes in diagnostics to predict or in planning treatments and interventions to promote healthy aging and longevity.

BACKGROUND OF THE INVENTION

The FOXO3A gene belongs to the forkhead family of transcription factors which are characterized by a distinct forkhead domain. This gene likely functions as a trigger for apoptosis through expression of genes necessary for cell death. Translocation of this gene with the MLL gene is associated with secondary acute leukemia. Alternatively spliced transcript variants encoding the same protein have been observed.

The FOXO3A gene is one of the human homologs of DAF-16, a gene that has been described to extend lifespan in the model organisms *C. elegans* (Murphy C T (2006) The search for DAF-16/FOXO transcriptional targets: approaches and discoveries. Exp Gerontol 41:910-921) and *D. melanogaster*. (Giannakou M E et al. (2007) Dynamics of the action of dFOXO on adult mortality in *Drosophila*. Aging Cell 6:429-438).

The FOXO3A gene is located on human chromosome 6q21, from position 108,987,719 to 109,112,664 (NCBI ver. 36), is composed of four (4) exons that can be alternately expressed, which results in the same protein (variant #1 is described by file NM_001455.3; variant #2 is described by file NM_201559.2. The FOXO3A protein is composed of 673 amino acids and is 71,277 Da in size. The amino acid sequence of FOXO3A, as defined by the file "NP_963853" at the NCBI is identified as SEQ ID No. 1 and is the following:

```
MAEAPASPAPLSPLEVELDPEFEPQSRPRSCTWPLQRPELQASPAKPSGE
TAADSMIPEEEDDEDDEDGGGRAGSAMAIGGGGGSGTLGSGLLLEDSARV
LAPGGQDPGSGPATAAGGLSGGTQALLQPQQPLPPPQPGAAGGSGQPRKC
SSRRNAWGNLSYADLITRAIESSPDKRLTLSQIYEWMVRCVPYFKDKGDS
NSSAGWKNSIRHNLSLHSRFMRVQNEGTGKSSWWIINPDGGKSGKAPRRR
AVSMDNSNKYTKSRGRAAKKKAALQTAPESADDSPSQLSKWPGSPTSRSS
DELDAWTDFRSRTNSNASTVSGRLSPIMASTELDEVQDDDAPLSPMLYSS
SASLSPSVSKPCTVELPRLTDMAGTMNLNDGLTENLMDDLLDNITLPPSQ
PSPTGGLMQRSSSFPYTTKGSGLGSPTSSFNSTVFGPSSLNSLRQSPMQT
IQENKPATFSSMSHYGNQTLQDLLTSDSLSHSDVMMTQSDPLMSQASTAV
SAQNSRRNVMLRNDPMMSFAAQPNQGSLVNQNLLHHQHQTQGALGGSRAL
SNSVSNMGLSESSSLGSAKHQQQSPVSQSMQTLSDSLSGSSLYSTSANLP
VMGHEKFPSDLDLDMFNGSLECDMESIIRSELMDADGLDFNFDSLISTQN
VVGLNVGNFTGAKQASSQSWVPG
```

FOXO3A interacts with YWHAB/14-3-3-beta and YWHAZ/14-3-3-zeta, UniProt: the Universal Protein Resource (www.uniprot.org), which is required for cytosolic sequestration. Upon oxidative stress, interacts with STK4, which disrupts interaction with YWHAB/14-3-3-beta and leads to nuclear translocation. The subcellular location of FOXO3A is in the cytoplasm, and cytosol. It translocates to the nucleus upon oxidative stress and in the absence of survival factors. In the presence of survival factors such as IGF-1, FOXO3A is phosphorylated on Thr-32 and Ser-253 by AKT1/PKB. This phosphorylated form then interacts with 14-3-3 proteins and is retained in the cytoplasm. Survival factor withdrawal induces dephosphorylation and promotes translocation to the nucleus where the dephosphorylated protein induces transcription of target genes and triggers apoptosis. Although AKT1/PKB doesn't appear to phosphorylate Ser-315 directly, it may activate other kinases that trigger phosphorylation at this residue. FOXO3A is phosphorylated by STK4 on Ser-209 upon oxidative stress, which leads to dissociation from YWHAB/14-3-3-beta and nuclear translocation.

Human longevity is a complex phenotype with multiple determinants. While non-genetic factors, including diet, physical activity, health habits and psychosocial factors are important, up to 50% of the variation in human lifespan might be explained by genetic differences.[1-5] Several studies suggest that about 25% of the variation in human lifespan in average-lived populations can be explained by genetic factors but in populations with larger numbers of exceptional survivors the genetic contribution to lifespan may be much higher. For example, family studies of nonagenarians and centenarians show that sibling relative risk, a common method for assessing potential genetic contribution to a complex phenotype,[6] is particularly high and grows with increasing age of the proband.[7-10] However, studies of candidate "longevity-associated" genes in humans, hereafter referred to as "longevity genes," have generally been disappointing. Few replications have been observed across populations, with the exception of the ApoE gene.[3]

In contrast, there have been several robust genetic findings in model organisms of aging.[11-13] For example, variation in single genes can result in substantial differences in lifespan in model organisms, particularly with genes that are considered part of the insulin/IGF-1 (HS) signaling pathway.[14-18]

Mutations that increase SIR-2 activity or that decrease insulin/IGF-1 signaling both increase the lifespan of *C. elegans* by activating the DAF-16/FOXO protein.[19,20] In mammalian cells, a Sir2 homolog "SIRT1," influences several downstream transcription events affecting lifespan, including the cellular response to stress. STRT1 accomplishes this by regulating the FOXO (Forkhead box transcription) factors, a family of proteins that function as sensors in the IIS pathway and are also regulators of longevity in several mammals.[17]

Genetic knock-out models in mammals (and other species) have also supported the HS hypothesis. For example, mice with a fat-specific insulin receptor knockout (FIRKO) have reduced fat mass, protection against age-related obesity and have extended longevity.[21] Many other mutations in the HS pathway appear to impact longevity in mice. These include mutations in the IGF-1 receptor,[22] IRS-1,[22] IRS-2,[23] PAPP-A,[24] and the Ames Dwarf mouse mutation.[22]

The basic molecular pathway of insulin signaling is conserved through evolution, evidence of which can be seen in yeast, flies, worms, rodents and humans.[25] A key regulator of this pathway in worms is the transcription factor DAF-16 (abnormal DAuer Formation-16), which is required for the large lifespan extension produced in *C. elegans* by inhibiting insulin/IGF-1 signaling.[16] A number of factors appear to extend lifespan in *C. elegans* in a daf-16 dependent manner, such as AMP kinase,[26] 14-3-3 proteins,[27] the lin-4 microRNA,[28] and heat shock factor.[29] Homologues of DAF-16 in several species have been linked to aging phenotypes and longevity.[30] For example, the stress responsive Jun-N-K terminal Kinase (JNK) pathway appears to require FOXO to prolong lifespan in *Drosophila*[31] and when flies over express dFOXO, the DAF-16 ortholog, it can markedly increase lifespan.[32] The remarkable convergence of such a diverse array of signals on DAF-16/FOXO suggests that this protein may be an important, evolutionarily conserved "node" in a signaling network that impacts aging and longevity.

The human homologue of DAF-16 includes four FOXOs: FOXO1, FOXO3A, FOXO4 and FOXO6. Therefore, it is tempting to hypothesize that common, natural variation in the form of single nucleotide polymorphisms (SNPs) in FOXO and related genes might influence human longevity. "FOXO3" is synonymous with "FOXO3A" since FOXO3B is a pseudo-gene on chromosome 17.

This is an appealing hypothesis. A connection between insulin, FOXO, oxidative stress and human longevity would be particularly interesting since oxidative stress has long been a favorite putative mechanism of aging. Since 1956, the free radical theory of aging has hypothesized that aging results partly from damage to DNA, cells and tissues from cumulative exposure to reactive oxygen molecules[33] and although not yet universally accepted, supportive evidence has accumulated over the years.[34,35] Thus, FOXO may provide a potential branch-point or bridge between insulin signaling, free radicals and human aging/longevity.

There has been some prior work linking genes in the IIS pathway to human longevity,[36,37] including an interesting recent report by Suh et al,[38] which links functionally significant IGF-1 receptor mutations to exceptional longevity, but we have not found any published reports of association between FOXO genes and human longevity. Prior studies have found links between FOXO genes and other aging phenotypes, including 4-year survival and stroke risk[39] as well as premature menopause.[40]

Human longevity, however, is a complex phenotype that encompasses disease-specific risks as well as the individual rate of aging. The study of its genetic antecedents is challenging. The study of longevity may be affected by small genetic effect sizes, population stratification artifact, population heterogeneity, lack of sufficient numbers of long-lived study participants, and other problems.[3,4,41] Therefore, in order to assess potential genetic contributions to human longevity from genes linked to HS signaling, we chose a large, homogeneous, long-lived population of men well characterized for aging phenotypes and we performed a nested-case control study of 5 candidate longevity genes with links to the IIS pathway. These genes were chosen based on prior associations with aging phenotypes principally from gene knockout, transgenic, mutant and other model organisms of aging.[3,4,14-17,16,42] Priority was given to genes that are involved in insulin sensitivity and glucose (energy) homeostasis.

The rapid aging of the population will place unprecedented challenges on society due to increased prevalence of chronic disease and disability.[45] Better understanding of mechanisms of aging, including biological pathways that may have widespread influence on how we age, could have important implications for lowering our risk for age-related disease and disability. There are many biologically plausible candidate genes for human longevity but only one finding has so far been widely replicated in multiple populations, that of the ApoE gene.[3] This gene has widespread effects on aging phenotypes, particularly cardiovascular disease and dementia, and as such influences the ability to achieve a long and healthy life.

SUMMARY OF THE INVENTION

The challenge in finding genes that have widespread effects on human aging phenotypes and longevity suggests that it may be helpful to use model organisms to identify a priori potential candidates before conducting human studies. Therefore, we chose to study several candidate genes within the human insulin/IGF-1 signaling pathway and/or oxidative stress response system on the basis of sequence and/or functional homology with model organisms of aging or prior human studies. We constructed a list of human candidate genes from these signaling pathways and assessed variations in these candidate genes occurring at a frequency of approximately 10% or greater in the Japanese population. Due to limited resources, only three SNPs were chosen from each gene for analysis. SNPs were selected from regions with linkage disequilibrium (LD), when possible, in order to provide maximal coverage of each gene.

In general the invention provides compositions and methods for detecting the FOXO3A "GCC" haplotype (e.g. a FOXO3A haplotype associated with an increased longevity, defined herein as the likelihood of a human subject living an additional 15 or more years). In preferred embodiments, the detected FOXO3A haplotypes are associated with either an increased likelihood or a decreased likelihood of living longer, however the invention necessarily encompasses materials and methods for detecting a FOXO3A haplotype associated with neither an increased nor a decreased likelihood of living longer and/or minimizing risk for age-associated diseases (e.g. a "normal" or "wt" genotype). Age-associated diseases refers to coronary heart disease (CHD), also known as coronary artery diseases, stroke, cancer, chronic obstructive pulmonary disease (COPD) or other chronic lung disease, Parkinson's disease, diabetes, obesity, dementia (and general cognitive function), frailty (ability to walk) or other age-related disease or physical and or cognitive impairment. There may also be an association with obesity in humans.

The "GCC" haplotype encompasses tens of kilobases of DNA. Other SNPs in this region demonstrate linkage disequilibrium with the three SNPs described herein. It is anticipated that additional SNPs will be identified within this GCC haplotype that also have an association with longevity and healthy aging, and may be useful of predicting age-associated diseases. The "GCC haplotype" can serve as a surrogate for other types of alteration of DNA, either within or adjacent to the FOXO3A gene, that is ultimately found to be the "functional variant" that leads to the prediction of exceptional longevity and/or healthy aging. These other alterations may be in the form of inversions, duplications, deletions, and may include other genes or transcripts that were previously unknown, for example, the gene "LOC100130966". LOC100130966 is similar to SMT3 suppressor of mif two 3 homolog 2 has been identified to lie within exon 2 of the FOXO3A gene, which is within the "GCC" haplotype. The DNA sequence for LOC100130966 is described by the GenBank accession ID# "XM_001725519" and the predicted amino acid sequence of LOC100130966 is described by GenBank file "XP_001725571".

Haplotype analysis may be used to potentially predict which patients would benefit by aggressive wellness or disease prevention/treatment interventions. Haplotype analysis may be provided in a kit form. Risk calculators could use such information for purposes of assessing likelihood of disease, disability or death or determining how many years of survival or disease-free survival a person has. Such information would be important to patients, health insurance companies, long term care insurance companies and physicians or other health care providers in order to provide some guidance as to the patient's long-term needs. Pharmaceuticals could be developed that modify the action of the FOXO3A gene, modify the cellular location of the FOXO3A protein and/or its interactions with other proteins, or modify the amount or type of protein produced by the gene in order to impact health or diseases related to aging.

Homologous sequences in mice may be associated with premature ovarian failure. Castrillon D H, Miao L, Kollipara R, Horner J W, DePinho R A. Suppression of ovarian follicle activation in mice by the transcription factor Foxo3a. Science. 2003 Jul. 11; 301(5630):215-8. Consequently, similar haplotype analysis can be useful in veterinary applications.

Further features of the invention will now become apparent from the following description, by way of example only, with reference to the accompanying Figures and Tables.

Figure 1:
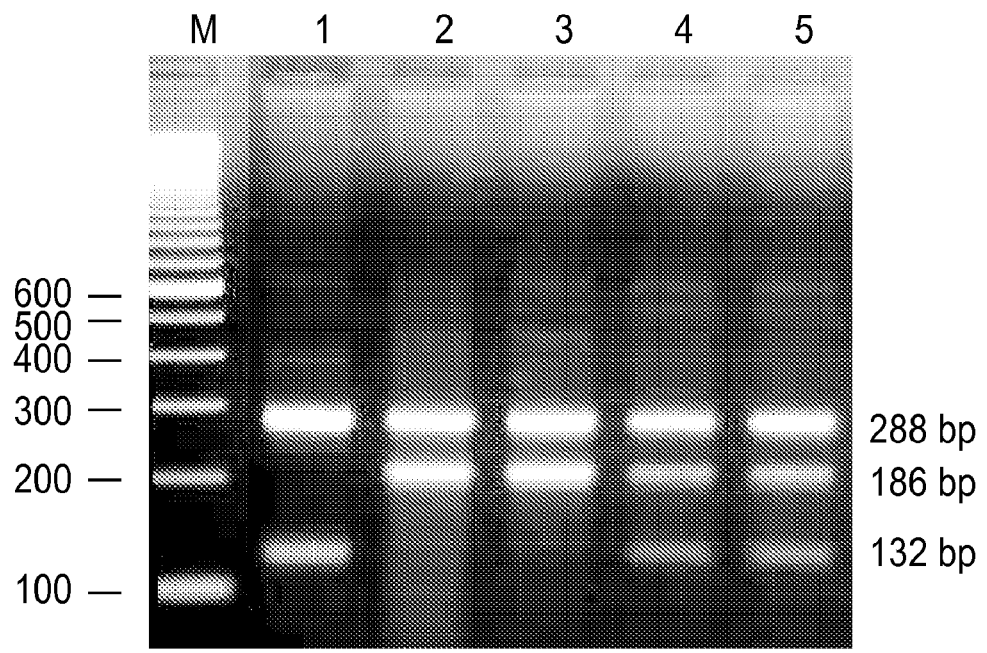
FIG. 1 shows the results of an ARMS-PCR assay to detect the FOXO3A G/T variants using the primers and conditions described in Table 10.

The following tables are part of the description:
Table 1. Baseline Characteristics of the HHP/HAAS Cohort in 1991-93 (n=3,741)
Table 2. Baseline Characteristics by Case-Control Status
Table 3. Candidate Genes for Human Longevity and the MAF in Cases and Controls
Table 4. FOXO 3A3 Genotype by Case-Control Status
Table 5. Difference in Health Status between Genotype Groups at Baseline
Table 6. Insulin Sensitivity Phenotypes According to FOXO3A Genotype
Table 7. Prevalence of Aging-related Phenotypes in Relation to FOXO3A3 Genotype
Table 8. Genotype Distribution by Maximum Attained Age
Table 9. Primers for Identification of the rs2802292 G-T Polymorphism
Table 10. PCR Conditions for Identification of rs2802292 G-T Polymorphism

DETAILED DESCRIPTION OF THE INVENTION

A. HAWAII LIFESPAN STUDY
Study Population

This nested-case control study was conducted as part of the Hawaii Lifespan Study, an embedded cohort study of healthy aging drawn from the original population of the Honolulu Heart Program (HHP) and Honolulu Asia Aging Study (HAAS). The HHP is a population-based, prospective study of cardiovascular disease among 8,006 Japanese American men that began in 1965. The HHP participants were recruited from 9,877 men with valid contact information who were born between 1900 and 1919 and lived on the island of Oahu in 1965.[61]

Study participants had both parents from Japan, usually the west and southern parts of Japan (94% from the central region or further west and south); 49% of them had parental origins from the adjacent prefectures of Hiroshima and Yamaguchi.[61,62] Although the most participants were born in Hawaii (88%), there is a theoretical possibility of confounding of case control status with allele frequencies due to geographic origin. Therefore, for certain analyses, cases and controls were stratified by parental prefecture of origin using conditional logistic regression models. Analyses showed no evidence for population stratification in the dataset (data not shown).

The HHP cohort recruitment, design, and procedures have been outlined in detail elsewhere.[62] Briefly, at the time of study enrollment (1965-1968), participants were aged 45 to 68 years (mean age, 54 years). From the commencement of the HHP, information on the development of incident coronary heart disease and stroke, as well as mortality from all causes, has been obtained by monitoring obituaries in local newspapers (English and Japanese) and through surveillance of hospital discharge records.[61] A follow-up survey in the 1991-1993 examination found that only 5 men could not be traced for mortality information.[63]

All participants for the current study were drawn from records of study participants updated to August, 2007. Archived phenotypic data and blood samples from Exam 4 of the HHP (1991-1993), which coincided with the commencement of the Honolulu Asia Aging Study (HAAS), was used as the baseline exam for this nested case-control study. The HAAS was begun as an expansion of the HHP for the study of neurodegenerative diseases, cognitive function and other aging phenotypes in elderly persons.[64] Participants included 3,741 men aged 71 to 93 at Exam 4 (mean age 77.9±4.7 years), approximately half the number of the original HHP.[64]

For the purposes of the current nested case-control study, "cases" (longevity phenotype) were defined as all HHP participants who had survived to at least the upper 1% of the 1910 U.S. birth cohort specific survival (minimum 95 years of age) from the time of recruitment.[65,66] A total of 213 individuals who had survived to at least 95 years of age, as of August 2007, were studied. 176 of these individuals had died (mean death age 97.5; SD 2.1; range of 95-106 years) and 37 individuals were still alive (mean age 98.7, SD 2.1; range 97-106 years).

The controls consisted of 402 individuals from the HHP/HAAS cohort who died near the mean death age for the 1910 U.S. birth cohort specific survival for middle-aged men (approximately 77 years of age). In order to achieve a case:control ratio of approximately 1:2, we sampled the HHP/HAAS study population for controls who died up to the age of 81 years. The mean age at death for our control population was 78.5 years (SD 1.8, range 73-81 years). This is slightly higher that of the U.S. male population, but consistent with the high average life expectancy of Japanese-American men in Hawaii, which was 3.5 years longer than white males at last report.[67] All cases and controls were ethnic Japanese whose families came mainly from Central-West Japan.[61,62]

Procedures were performed according to institutional guidelines and approved by the Institutional Review Board of Kuakini Medical Center. Written informed consent was obtained from all study participants or from family representatives, if participants could not provide consent.

Genotyping

We chose three SNPs from each of five candidate genes. We chose genes that have well-described influences on aging pathways in model organisms. All genes were chosen based on hypothetical links to the HS pathway and potential links to energy homeostasis, glucose and/or lipid metabolism, see FIG. 1. SNPs were chosen based on their minor allele frequencies reported in the HapMap or JSNP database (snp.ims.u-tokyo.ac.jp).

Total cellular DNA was isolated using the PureGene system (Gentra Systems, Inc.) quantified using PicoGreen staining (Molecular Probes, Eugene, Oreg.) and SNPs from candidate genes genotyped using allelic discrimination assays. Taq Man® (Applied Biosystems, Inc.) reagents were purchased from ABI and SNPs were chosen with a frequency ≥~0.1 in the Japanese population (http://www.ncbi.nlm.nih.gov/projects/SNP/). PCR was amplified under standard conditions using Taq Gold (Perkin-Elmer, Corp) and detection of PCR products with Taq Man® assay, using a 6-FAM-labeled FRET probe for one allele and a VIC-labeled probe for the other allele, using minor groove binding (MGB) quenchers to enhance detection of assays. PCR products were measured with the ABI Prism 7000 Sequence Detection System.

Genotype data were managed through an integrated database system (MS Excel, Microsoft, Inc). All positive controls on each genotyping plate were also evaluated for consistency. Positive markers were tested for deviation from Hardy-Weinberg equilibrium. Call rates exceeded 98%.

Statistical Analysis

SNPs were evaluated for deviation from Hardy-Weinberg equilibrium. The Pearson chi-square test was used to compare the cases and controls for equal genotype frequencies using the software program StatXact.[68] For estimates of strength of association, odds ratios were estimated using logistic regression models from SAS.[69] General linear model (GLM) and analysis of covariance (ANCOVA) were further used to compare proportion of healthy study participants by FOXO3A genotype. For the analysis of aging phenotypes in case and controls, Student's t test for comparing distribution of continuous variables and Chi square for proportional variables.

Results

The baseline characteristics of the HHP/HAAS study population at the 1991-1993 examination are presented in Table 1. The mean age was 77.9 years and 100% of the population was male and of Japanese ethnicity. Biological characteristics, general health status, disease prevalence and functional status are presented.

TABLE 1

Baseline Characteristics of the HHP/HAAS Cohort in 1991-93 (n = 3,741)

| Variables at Baseline Exam (1991-93) | Mean ± SD | Min-Max |
|---|---|---|
| Biological Characteristics | | |
| Age (y) | 77.88 ± 4.69 | 71 93 |
| Body Mass Index (BMI) kg/m2 | 23.43 ± 3.16 | 12.25-39.34 |
| Waist/Hip Ratio | 0.94 ± 0.06 | 0.73-1.27 |
| Total Cholesterol (mg/dl)* | 189.73 ± 33.16 | 81-382 |
| Triglyceride level (mg/dl)* | 148.96 ± 93.85 | 32-1369 |
| HDL (mg/dl)* | 50.94 ± 13.36 | 20-129 |
| Glucose (mg/dl)* | 113.03 ± 29.4 | 44-399 |
| Insulin (mIU/L)* | 16.82 ± 32.48 | 1.5-1164 |
| General Health Status | | |
| Self-Reported "Poor" Health (%) | 32.88 | — |
| Disease Prevalence | | |
| CHD (%) | 19.38 | — |
| Stroke (%) | 4.73 | — |
| Cancer (%) | 13.84 | — |
| Diabetes (%) | 58.11 | — |
| Physical and Cognitive Function | | |
| Lower Body (Difficulty Walking) (%) | 20.47 | — |
| Upper Body (Grip Strength in kg) | 30.09 ± 6.88 | 0 55 |
| Cognitive Score (CASI) | 82.24 ± 16.37 | 0-100 |

*Fasting values

From this 1991-93 baseline population, we selected all participants who, by 2007, had survived to age 95 years or more as "longevity" cases (n=213). We then selected all participants who died before the age of 81 years as "average" lived controls (n=402). Baseline characteristics of the cases and controls are presented in Table 2. In terms of biological characteristics, the long-lived cases were older, leaner (lower waist: hip ratio), had lower triglycerides (borderline), lower glucose, lower insulin levels and higher prevalence of the FOXO3A3 allele at the baseline exam. The cases also had better self rated health and lower prevalence of cardiovascular disease (CHD and stroke) and cancer. Functionally they appeared better able to walk but had lower grip strength. There was no significant difference in cognitive score.

TABLE 2

Baseline Characteristics by Case-Control Status

| Variables at Baseline Examination (1991-93) | Average Lived Phenotype (Mean Attained Age 78.5 y) | | Longevity Phenotype (Mean Attained Age 97.9 y)* | | P† |
|---|---|---|---|---|---|
| | Mean ± SD | Min-Max | Mean ± SD | Min-Max | |
| Biological‡ | | | | | |
| Age at Baseline Exam (y) | 74.63 ± 2.05 | 71-79 | 85.62 ± 3.12 | 80-93 | <.0001 |
| Body Mass Index (BMI) kg/m² | 23.4 ± 3.17 | 15.89-32.33 | 23.0 ± 2.91 | 15.4-31.1 | 0.1272 |
| Waist/Hip Ratio | 0.95 ± 0.06 | 0.78-1.15 | 0.93 ± 0.06 | 0.73-1.07 | 0.0008 |
| Total Cholesterol (mg/dl) | 187.96 ± 34.6 | 98-303 | 185.36 ± 32.16 | 95-304 | 0.3680 |
| HDL (mg/dl) | 50.82 ± 14.17 | 21-129 | 51.29 ± 13.54 | 27-100 | 0.6911 |
| Triglycerides (mg/dl) | 154.72 ± 118.72 | 46-1369 | 140.32 ± 82.23 | 38-649 | 0.1178 |
| Log Triglycerides§ | 4.88 ± 0.51 | 3.83-7.22 | 4.81 ± 0.50 | 3.64-6.48 | 0.0965 |
| Glucose (mg/dl) | 117.83 ± 35.9 | 69-323 | 108.98 ± 22.55 | 77-298 | 0.0012 |
| Insulin (mIU/L) | 25.54 ± 82.89 | 3.3-1164 | 13.8 ± 11.39 | 1.5-104 | 0.0421 |
| Log Insulin§ | 2.69 ± 0.74 | 1.19-7.06 | 2.44 ± 0.58 | 0.41-4.64 | <0.0001 |
| FOXO3A3 MAP (rs2802292) | 0.255 | — | 0.371 | — | <0.0001 |
| General Health Status | | | | | |
| Self-rated "Poor" Health (%) | 41.92 | — | 31.07 | — | 0.0163 |
| Disease Prevalence | | | | | |
| CHD (%) | 26.37 | — | 7.55 | — | <0.0001 |
| Stroke (%) | 7.46 | — | 3.3 | — | 0.0394 |
| Cancer (%) | 20.15 | — | 13.68 | — | 0.0468 |
| Diabetes (%) | 60.55 | — | 59.81 | — | 0.8587 |
| Physical/Cognitive Function | | | | | |
| Lower Body (Difficulty Walk | 30.59 | — | 16.83 | — | 0.0002 |
| Upper Body (Grip Strength in | 29.85 ± 7.54 | 0-47 | 26.37 ± 5.53 | 8-45 | <0.0001 |
| Cognitive Score (CASI)¶ | 80.96 ± 19.48 | 0-100 | 78.54 ± 13.85 | 12-98 | 0.1088 |

*Cases (longevity phenotype) consisted of all HHP/HAAS participants with DNA samples (living and dead) who had reached the age of 95 years by August 2007: Gp 1: Alive, n = 37, mean age 98.7, range 97-106 years; Gp 2: Dead, n = 166, mean death age 97.5, range 95-106 y);
†p value from Students t test for continuous variables and Chi Square for categorical variables;
‡Fasting values;
§Log transformation performed for variables not normally distributed;
¶CASI (Cognitive Abilities Screening Instrument)[43]

Five genes were investigated (ADIPOQ, FOXO1A, FOXO3A, SIRT1, and COQ7). Minor allele frequencies and other related genetic information for the cases and controls are presented in the Table 3. However, only FOXO3A genotype was associated with longevity using an initial cut-off value of p<0.05.

TABLE 3

Candidate Genes for Human Longevity and the MAF in Cases and Controls

| Gene Name | Symbol | SNP ID# | Variable Name | Minor allele freq. (MAF) | | P* |
|---|---|---|---|---|---|---|
| | | | | Cases | Controls | |
| †Adipo, C1Q, CDC | ADIPOQ | rs1063539 | ADIPOQ_1 | 0.297 | 0.263 | 0.20 |
| | | rs182052 | ADIPOQ_2 | 0.455 | 0.493 | 0.22 |
| | | rs266729 | ADIPOQ_3 | 0.195 | 0.239 | 0.08 |
| Forkhead Box O1A | FOXO1A | rs2755209 | FOXO1A1 | 0.272 | 0.291 | 0.48 |
| | | rs2721069 | FOXO1A2 | 0.293 | 0.307 | 0.62 |
| | | rs2755213 | FOXO1A3 | 0.350 | 0.358 | 0.77 |
| Forkhead Box O3A | FOXO3A | rs2764264 | FOXO3A1 | 0.347 | 0.248 | 0.0002 |
| | | rs13217795 | FOXO3A2 | 0.340 | 0.248 | 0.0006 |
| | | rs2802292 | FOXO3A3 | 0.371 | 0.255 | <0.0001 |
| Sirtuin 1 | SIRT1 | rs7069102 | SIRT1_1 | 0.185 | 0.181 | 0.84 |
| | | rs10823112 | SIRT1_2 | 0.337 | 0.360 | 0.44 |
| | | rs1885472 | SIRT1_3 | 0.188 | 0.179 | 0.71 |
| Coenzyme Q7 | COQ7 | rs8051232 | COQ7_1 | 0.147 | 0.150 | 0.90 |
| | | rs11074359 | COQ7_2 | 0.153 | 0.171 | 0.43 |
| | | rs7192898 | COQ7_3 | 0.162 | 0.170 | 0.73 |

*Comparing MAF between cases and controls with Chi-square test;
†Adipocyte, C1Q, and Collagen Domain Containing.

Variant "rs2764264" has previously been referred to as "rs12524491". The DNA Sequence of SNP rs2764264 ("FOXO3A1") identified as SEQ ID No. 2 is:

TATTTCACTGGCCAGGACCTCCAATACATTGTTGAATAGCAGTGGTGAAA

GCAGAGATCCTTACCATTTTTCTCATCTTAAGGGGAAAGCATTCAGTCTT

TCACTGTTAAGTATCATGTTAGGTGTAAGTTTGTCACATATTTCCTTTAT

CAGGCTGAGGTAGTTTTCTCTATTCCTATGTGTTGAGTAGTTTTGTTTT

TTAAATTATGAGTGGATATTGAATTTTGTCAGATGCTTTTTCCTCACCTG

TTGAGAAGATCAGATGGTTTTTCTTTTTCAGTCTTTTAATATGATGAAAT

ACATTGACTGATTTGCAATGTTAAACCAACCTTACATTCCTGGGATAAAT

CCCACCTGGTCTTGATATGTTACCATGAGATTCAAGTAGCTAAAATTTTG

TTAAGGATTTTTGTGTCTGTCTTCATGAGGAATATTGATCTATACATTTC

TTATAATATCTTTGCCTGTTTTTGGTACCAGGGTAATGGTGGTCTTATAA (C/T)

ATGAGTTGGAAAGTGTTCCCTGTTCTGCTCTGGTAGCACTGTAGTATCTC

TTCCTTAAATGTTTGGTAGAATTCAACGGCAGTTAAGCCATCAGAGCCTG

GAGTTTTTTGTGTGTGAGGAAATGTTTAACTGCTAATTCAATTTATTTC

ATAGATACAATGCTGTTGGCTTGTCTGTTTCTTCTTGAATGAGTTTTGGT

AGTCTGTGTCTTTTAAGGAATTTGCCCATTTTATTTAAGTTGTCTAATTT

ATGGGCATAAAGTCATTTATAATGTTCTCTTATTATCCTTTTAATAGATA

TATCATCTGTAGTGATTTCATTTTCATTCCTGATGTTGATAATTTGTCTT

AACTCCCTTTCCCCCTCATTCCTTATCTGTTTAGTGCCTTGCAATTTCAT

TGATCTTTTAAACGAATTAACATTTGCTTCCACTGACTTTTCCCCCGTTA

CTTTTATGTTTTACTTCCATTGATTTTTTTTTCTCTTTTAATCTTTTA

The DNA Sequence of SNP rs13217795 ("FOXO3A2") is identified as SEQ ID No. 3 is:

CACCACCACCCACTAGACAAATTGCTTAACCTTTCTGCACCTCAGTTTCC

TCCTGACAGGCTTGTTTAGAAAATAAAATGAGATCAAATTTGTCAAGCAC

AGAGCATTGGCCCTGGTAGGCACCACATACATGAATTTCCTTCAGATTGT

AGGTGAAGTAGACTTGATTTGGGATTTCTCTTGTTACCTAGGTGCTTGTG

TAGAGGAGACTTTAGAACCAGAATGTGTTATTTGTGGTTTTGAGTGTGCC

TGGGACTCTGAGCCAACTGAATTACCAAGTAATGGGGCCCCATGGCATC (C/T)

CATGACAGGTGGAGAGCCGGCTCTTCACCCTGGATGGACCTGAAATGCCT

GCTAAGGCCTTGCTCCACCGAGTAGCACACACCCTATCAGTTTGCCCTTC

TTTCCATCTCTTATTCTAGAGACCTTAAAGCCTACTTGTTGGTATATATT

TTCAGGTTTTTGGAAATTGGGCTGTTTAATTGAAGTTAATACCAGTGATG

AGACTTTTCAACCTGAGAACAACCTAGATGCTACTTCACATTTTGCAGTG

GAAGCTTACTTCCATCTTCACTCATGTAGGACATTCTTTGGTCTCAATGT

The DNA Sequence of SNP rs2802292 ("FOXO3A3") identified as SEQ ID No. 4 is:

TGAAGCAGGGCATCAGGGAATGGGAGTTGGTGAGGAAATTACATTAACAT

TTATTGAGCACCATTCTCACTATAAACCTGAACGTAAATATTATTATTAT

TATTATTATTATTATTATTATTATTATTATTATTATTATTTTAGTAGAGA

TGAGGCCTTGCTGTGTTGCCTAGACTGGTCTTGAACTCCTGGGCTCAAGC

AATCCTCTCACCTTGGCCTCTCAAAGTGCCTCTCAAAGGTGTGAGCCACC

ATGCCCAGCCTATTCGTTTTAATTTCTGAAGAAACTGAGGCTAACAGCT

GGGTCTGGCCCATGACTGGTTCAGTTGGTATTTGGTGGACCAAGTTGACC

AAGCTCACCCAGCTTCTGAGTGACAGAGTGAATATAAACCCAGCCTGCTC

ACTCCATTTCCTAGTTTTCTCACCTCTACCAGGGTCTCTGTTGCTCACAA

GAGCTCAGGGCTGGGA (G/T)

AAGCCTCTGTGTGACAGATGAAGGGGTCCTGCTGCTCTCTAGGGAAGAAT

CGGTCCCAAATTGCTCAAGGGAGTAAGGTGGTTTCGTTGAGGAGCATCAG

CTAGGGGATTGATGGGAATAGGTGTCAGGCAGCCAGTGGAAATTTTGTG

TGCCCACCTGTGGCACATGTATTATGCAAATTCATGCAAAAATATATATA

The "GCC haplotype" can be described using SNPs rs2764264, rs13217795, and rs2802292 and is the allele that contains the following combination of genotypes:

| rs2764264 | rs13217795 | rs2802292 |
|---|---|---|
| "C" | "C" | "G" |

When viewing these variants from the top of the chromosome (lower nucleotide position on the genetic map) to the bottom (higher nucleotide position on the genetic map) the "GCC haplotype" can be described using SNPs rs2802292, rs2764264, and rs13217795 according to NCBI nomenclature, and is the allele that contains the following combination of genotypes:

| SNP ID # | rs2802292 | rs2764264 | rs13217795 |
|---|---|---|---|
| SNP Variable Name from Table 3 | FOXO3A3 | FOXO3A1 | FOXO3A2 |
| Chromosome 6 Nucleotide Position | 109015211 | 109041154 | 109080791 |
| SNP Allele | "G" | "C" | "C" |

The above data are from:

Database of Single Nucleotide Polymorphisms (dbSNP). Bethesda (Md.): National Center for Biotechnology Information, National Library of Medicine. (dbSNP Build ID: 129, NCBI genome build 36.3). Available from: http://www.ncbi.nlm.nih.gov/SNP/[70]

Further investigation comparing the genotype frequencies of FOXO3A3 between cases and controls revealed a highly significant difference with an exact p value of 0.00009 using the permutation distribution of the Pearson's chi-square statistic. These results are presented in Table 4. There were five loci with 3 SNPs within each allele in this study (Table 3) so Bonferroni adjustment for multiple comparisons resulted in a corrected p value of 15×0.00009=0.00135. Due to the high link LD between the 3 SNPs of FOXO3A, we further investigated the FOXO3A3 SNP only (rs2802292). The odds ratio (OR) for homozygous minor vs. homozygous major alleles for FOXO3A3 between the cases and controls was 2.75 (95% CI: 1.51-5.02, p=0.0007), and the OR for heterozygous vs. homozygous major alleles between the cases and controls was 1.91 (95% CI: 1.34-2.72, p=0.0003). These results suggest an additive effect on longevity.

TABLE 4

FOXO 3A3 Genotype by Case-Control Status

| Case-Control Status | FOXO 3A3 Genotype (rs 2802292) | | |
|---|---|---|---|
| | TT | TG | GG |
| Average-Lived Phenotype* | 223 (55%) | 153 (38%) | 26 (6%) |
| Longevity Phenotype† | 81 (38%) | 106 (50%) | 26 (12%) |
| p value for Pearson Exact test‡ | | 0.000091 | |
| p value after Bonferroni adjustment | | 0.00135 | |

*number and % of subjects from n = 402 "average-lived" decreased controls (mean attained age 78.5 years)
†number and percent of subjects from n = 213 "long-lived" cases (mean attained age 97.9 years)
‡From the exact Pearson Chi-square test comparing the genotype frequencies in the cases and controls.

In order to understand more about the longevity phenotype at younger ages, we compared the proportion of people who were healthy at the baseline exam (1991-93) for each of the three FOXO3A genotype groups using the definition of healthy survival from Willcox et al. (2006).[44] The differences were highly significant (Table 5). Those who possessed one or more G alleles were much more likely to be healthy at baseline than those who were homozygous for the major (TT) allele. Approximately 75% of those homozygous for the minor allele were healthy at the baseline exam versus only about 57% of those homozygous for the major allele. After adjusting for case-control status, the differences were still marginally significant. This suggests that there was remaining association of the allele with health status within the categories of long term survivors (cases) and controls.

TABLE 5

Difference in Health Status between Genotype Groups at Baseline

| | % Healthy at Baseline* | | | p for trend | |
|---|---|---|---|---|---|
| | Homo. Major | Heter. | Homo. Minor | Un-adjusted | Adj. for Case-Control Slat |
| FOXO3A1 | 57.41 | 69.48 | 75.51 | 0.01 | 0.065 |
| FOXO3A2 | 57.37 | 69.35 | 77.08 | 0.01 | 0.035 |
| FOXO3A3 | 57.89 | 68.34 | 75.00 | 0.02 | 0.097 |

*"Healthy" defined as absence of six major chronic diseases (CHD; stroke, cancer, PD, COPD and treated Type 2 DM; high physical function (can walk ½ mile) and high cognitive function (CASI score >74).

In order to assess whether there was a relation between insulin sensitivity, a potential intermediate phenotype of longevity, and genotype, we tested the relation between fasting insulin, glucose, HOMA and genotype (Table 6). For non-normally distributed variables we used log conversion to a normal distribution. There was a significant relation between insulin, log insulin, HOMA and genotype. Homozygosity for the G allele was associated with markedly lower insulin, log insulin and HOMA score, but in controls only.

TABLE 6

Insulin Sensitivity Phenotypes According to FOXO3A Genotype

| | FOXO3A Genotype (rs 2802292) | | | |
|---|---|---|---|---|
| | TT | TG | GG | P* |
| Fasting Glucose (mg/dl) | | | | |
| Average-Lived | 118.4 ± 34.0 | 117.4 ± 38.0 | 115.9 ± 40.1 | 0.80 |
| Long-Lived | 108.3 ± 20.7 | 109.1 ± 23.7 | 110.5 ± 24.1 | 0.73 |
| Fasting Insulin (mIU/L) | | | | |
| Average-Lived | 23.7 ± 81.2 | 30.4 ± 91.9 | 13.2 ± 5.9 | 0.004 |
| Long-Lived | 13.5 ± 9.0 | 14.1 ± 13.4 | 13.3 ± 9.3 | 0.77 |
| Log Fasting Insulin (mIU/L) | | | | |
| Average-Lived | 2.68 ± 0.67 | 2.73 ± 0.85 | 2.47 ± 0.48 | 0.03 |
| Long-Lived | 2.45 ± 0.55 | 2.43 ± 0.61 | 2.44 ± 0.52 | 0.99 |
| HOMA IR Score | | | | |
| Average-Lived | 9.1 ± 53.0 | 10.0 ± 32.2 | 3.8 ± 2.4 | 0.03 |
| Long-Lived | 3.7 ± 2.8 | 4.0 ± 4.3 | 3.6 ± 2.2 | 0.55 |

*p-value for Student's t-test comparing mean values between GG genotype and other groups within cases and controls.

We also tested for a relation between lifetime prevalence of several chronic diseases and FOXO3A genotype in study participants (Table 7).

TABLE 7

Prevalence of Aging-related Phenotypes in Relation to FOXO3A3 Genotype

| | FOXO3A3 Genotype | | | | | FOXO3A3 Genotype | | | |
|---|---|---|---|---|---|---|---|---|---|
| | TT | TG | GG | p | | TT | TG | GG | p |
| | CHD prevalence (%) | | | | | Cancer prevalence (%) | | | |
| Average-Lived | 32.3 | 18.3 | 23.1 | 0.010 | Average-Lived | 22.4 | 18.3 | 11.5 | 0.326 |
| Long-Lived | 7.4 | 7.6 | 7.7 | 0.998 | Long-Lived | 17.3 | 12.4 | 7.7 | 0.400 |
| All | 25.7 | 14.0 | 15.4 | 0.002 | All | 21.1 | 15.9 | 9.6 | 0.075 |

TABLE 7-continued

Prevalence of Aging-related Phenotypes in Relation to FOXO3A3 Genotype

| | FOXO3A3 Genotype | | | | | FOXO3A3 Genotype | | | |
|---|---|---|---|---|---|---|---|---|---|
| | TT | TG | GG | p | | TT | TG | GG | p |
| Stroke prevalence (%) | | | | | Diabetes prevalence (%) | | | | |
| Average-Lived | 6.7 | 8.5 | 7.7 | 0.813 | Average-Lived | 60.6 | 62.3 | 50.0 | 0.498 |
| Long-Lived | 4.9 | 1.9 | 3.8 | 0.510 | Long-Lived | 57.5 | 64.1 | 50.0 | 0.368 |
| All | 6.3 | 5.8 | 5.8 | 0.974 | All | 59.8 | 63.0 | 50.0 | 0.212 | p value based on Chi-Square test comparing frequency of GG genotype to other genotypes for average lived controls (n = 402), long lived cases (n = 213) and all subjects (n = 615).

A significant protective relation was found for homozygosity for the G allele with regard to prevalence of CHD and a borderline relation for cancer and cognitive function. Finally, we assessed the FOXO3A3 minor allele frequency (MAF) distribution by maximum attained age in all participants combined (cases and controls). The MAF increased markedly with age, as expected by earlier case-control analyses (Table 8).

TABLE 8

Genotype Distribution by Maximum Attained Age

| Age at Death (years)* | N | MAF of FOXO3A3 |
|---|---|---|
| 72-74 | 17 | 0.21 |
| 75-79 | 277 | 0.25 |
| 80-81 | 108 | 0.26 |
| 95-99 | 185 | 0.37 |
| 100-106 | 28 | 0.39 |

*37 "long-lived" cases were still alive; mean age of 98.7 y (range 97-106).

The analysis of five candidate genes demonstrated that one gene clearly stood out from the others in terms of a potential human longevity gene—FOXO3A. That this gene might be important to human longevity is supported by several lines of evidence. First, in nested case-control analyses, variation within this gene was strongly associated with longevity. The odds ratio (OR) for being homozygous minor vs. homozygous major for FOXO3A3 allele (rs 2802292) between the cases and controls was 2.75 (95% CI: 1.51-5.02, p=0.0007), and the OR for heterozygous vs. homozygous major between the cases and controls was 1.91 (95% CI: 1.34-2.72, p=0.0003). These results suggest an additive effect of the FOXO3A3 G allele on longevity. (i.e., two copies of the G allele conferred about twice the protective effect). Consistent with this, the minor allele frequency rose markedly with age of the study participants, from septuagenarian to centenarian ages (Table 8).

Second, all three SNPs that were assessed in the FOXO3A gene, which were in tight linkage disequilibrium (LD), were strongly correlated with the longevity phenotype. This indicates that the finding was unlikely due to chance. Third, those who possessed one or more of the minor (G) alleles were much more likely to be healthy at the baseline exam, approximately 15 years prior, than those homozygous for the major (TT) allele. About 75% of those homozygous for the minor allele were healthy at baseline exam versus only about 57% of those homozygous for the major (TT) allele (Table 5).

In fact, the baseline exam suggested that cases were markedly healthier than controls despite the fact that cases were, on average, 11 years older. The cases possessed significantly less age-related disease, including less prevalent CHD, stroke, and cancer. They also had better self-rated health and generally had high physical function, including less difficulty walking. Interestingly, despite being more than a decade older than controls, the longevity cases had similar levels of cognitive function. This supports the existence of a "healthy aging" phenotype where individuals somehow delay or avoid major clinical disease and disability until late in life. The healthy aging phenotype that we observed in cases is similar to the healthy aging phenotypes reported in centenarians at younger ages when compared to their age-matched birth cohorts[46-48] and in centenarian offspring.[49] Long-lived cases also had metabolic profiles that suggested higher insulin sensitivity at younger ages, with lower waist to hip ratio, lower glucose levels, lower insulin levels and lower HOMA values (Tables 2 and 6). Several phenotypes were associated with variation in FOXO3A genotype.

Surprisingly, there was no significant difference in diabetes prevalence between cases and controls. However, since the cases were more than a decade older than controls, and diabetes tends to increase markedly with age, it is noteworthy that prevalence of diabetes was not significantly different. In fact, both cases and controls had a high prevalence of diabetes (near 60%), despite relatively low BMI. Why Type 2 diabetes tends to be more prevalent in Japanese at a relatively low BMI is not completely understood.[50] However, there may be metabolic differences in Japanese (and some other Asians) with higher visceral fat in Asians at lower BMI than whites and blacks.[51,52] Indeed, Japan national guidelines reflect such population differences and consider Japanese obese at a BMI of 25.[53] Other contributing factors to the high prevalence of diabetes in the HHP/HAAS cohort include the fact that all participants were tested for diabetes by several different clinical tests and at several prior examinations making detection more likely.

Of note, FOXO3A genotype was significantly associated with plasma insulin levels as well as CHD, cancer and Type 2 diabetes prevalence. This is consistent with a known role for FOXO as a mediator of the effects of insulin and insulin-like growth factors on diverse physiological functions, including cell proliferation, apoptosis and metabolism.[17,54] Genetic studies in C. elegans and Drosophila have shown that FOXO proteins are ancient targets of insulin-like signaling that regulate metabolism and longevity. Additional work in mammalian cells has shown that FOXO proteins are the targets of protein kinases, influence cell cycle progression, and regulate resistance to oxidative stress in vitro.[54] In vivo studies have shown that FOXO modifies hepatic glucose output in response to insulin and mediates other metabolic actions.[54] This strengthens the evidence that FOXO proteins may mediate insulin effects on metabolism and influence longevity in humans.

Overall, the totality of the evidence supports a potential role of FOXO3A in human health, aging and longevity. The association of FOXO with diverse aging phenotypes, including insulin sensitivity, CHD, cancer, Type 2 diabetes and longevity, is suggestive of a "gatekeeper" role in the IIS pathway. An important downstream mechanism whereby FOXO3A might influence human aging is through modification of oxidative stress—a long held theory of how we age,[33] although we have no direct evidence for this in the current study. However, since FOXO genes are the closest human homologues of C. elegans DAF-16, which protects cells from oxidative stress, this is a plausible mechanism of action for modification of human aging.[17] In C. elegans, DAF-16 increases the expression of manganese superoxide dismutase (SOD2), which converts superoxide to less damaging hydrogen peroxide and is a potent endogenous protector against free radicals,[55] among other "anti-aging" effects. In vivo studies show that oxidative lesions in DNA, proteins and other tissues accumulate with age and feeding calorically restricted diets (a potent insulin sensitizer) to rodents[56] and humans[57] mitigates this damage.

While FOXO was clearly associated longevity we did not observe a strong effect of genotype on insulin sensitivity in cases—just controls. However, the GG genotype demonstrated similarly low plasma insulin levels in both cases and controls, consistent with a modulating effect of genotype on insulin levels in both groups. It is tempting to speculate that since the cases showed greater insulin sensitivity no matter what their genotype that they have multiple mechanisms to maintain insulin sensitivity other than FOXO. This would be consistent with the hypothesis that most longevity genes have modest or small effect sizes. It is also possible that small sample size limited our ability to detect differences in the cases. On the other hand, long-lived mice carrying mutations in either IRS-1[58] or IRS-2[23] are actually insulin resistant, so insulin sensitivity is not a necessary condition for mutations in the IIS pathway to be able to confer greater longevity.

However, it is interesting to note that in C. elegans, several genes that by themselves may have small effects on lifespan, are influenced by the transcription regulating "master gene" DAF-16.[59] Small differences in FOXO3A that may be otherwise difficult to detect, could theoretically modify several downstream genes related to DNA binding, protein-protein interactions, cell cycle progression, apoptosis and metabolism. In this manner, a small modifying effect by FOXO3A potentially has larger, additive downstream effects on aging phenotypes and longevity.

Supportive evidence is beginning to accumulate for a role of insulin-signaling in human aging and longevity but the genes that might mediate these effects are not known. Prior studies have found over or under representation of single nucleotide polymorphisms (SNPs) from the insulin-IGF-1 signaling pathway in long-lived humans of Italian,[36] Japanese,[37,42] Dutch[60] and Ashkenazi Jewish[38] ethnicity, with links to several aging phenotypes. While some of these findings have been limited by small effect sizes and marginal statistical significance, the study by Suh et al.[38] also demonstrated that functionally significant mutations in the IGF-1 receptor exist in some long-lived humans, such as centenarians.

To date, there has little study of FOXO genes and phenotypes of aging in humans. Two recent studies suggest that FOXO genes deserve further scrutiny. First, a longitudinal study of elderly Dutch men and women found that a FOXO1 A haplotype predicted 4-year survival and that a FOXO3A haplotype predicted stroke risk.[39] Second, the Framingham Study, in a genome-wide association analysis, found that a FOXO3A SNP was strongly associated with age at natural menopause in women (p=0.00003). However, the Dutch findings were not statistically significant when accounting for multiple comparisons and both studies need replication. The present study is supportive and extends the associations of FOXO3A to human longevity and insulin sensitivity.

One of the major advantages of the current study is that it employed a nested case-control design. This study design selects cases and controls from an ongoing cohort study with longitudinally collected data. Therefore, several phenotypes of interest (e.g. disease prevalence, health status, function) were obtained by direct clinical examination when the participants were younger making the data less subject to recall bias. Recall bias, where study results are less accurate due to difficulty in remembering past events, can be a significant challenge with older adults.

Indeed, studies of exceptional survivors, such as centenarians, that have found evidence for phenotypes suggestive of slower aging[46-48] could potentially suffer from significant recall bias. That is, older participants may not recall precisely their past medical history and their past functional status. However, in the current study, major diseases were adjudicated by a morbidity and mortality committee and performance-based measures of physical and cognitive function were used to supplement self-reports, and evidence was found for such a healthy aging phenotype. This lends prospective support to previous retrospective work.

There are several other strengths to this study. First, the candidate genes selected for analysis were chosen a priori based on hypothesis-driven criteria. That is, studies of models organisms of aging employing various methods, particularly knockouts, have shown that the IIS pathway is important for aging and longevity. And many functions appear to be evolutionarily conserved. Second, the findings are strong, highly significant, and include several adjacent SNPs in the FOXO3A gene. Third, the findings are biologically plausible and support the prior findings in animal models of aging and also support the limited prior human studies. Fourth, the case-control associations with longevity were detected using a nested case-control analysis with a high event rate (deaths) during a long period of follow-up. Fifth, the HHP cohort is a highly homogenous cohort and there was no population stratification detected in our study participants.

A possible drawback is that since the cases and controls had an average age difference of 11 years we cannot exclude birth cohort as a confounder. But this is unlikely since there was a maximum 19-year difference in birth years between participants. Also, sub analyses revealed no differences in education and occupation (data not shown) between cases and controls. Moreover, it was the participants who were older at baseline who were more likely to have lived to 95-plus years and thus obtain the longevity phenotype. Most cohort effects show health advantages for younger cohorts. Another possible drawback is that this study was conducted in only one population and thus should be replicated in other populations in order to assess its generalizability.

In summary, we found that common, natural genetic variation within the FOXO3A gene was strongly associated with human longevity. The prevalence of the protective allele increased markedly with age. Long-lived cases were also more likely to possess several additional phenotypes linked to healthy aging, including lower prevalence of cancer and cardiovascular disease, better self-reported health, high functional status and they exhibited several biological markers suggestive of greater insulin sensitivity at the baseline exam. Finally, particular variants within the FOXO3A gene were also associated with several of these aging phenotypes, including insulin sensitivity, a putative intermediate phenotype of longevity.

B. DETECTION OF ALLELES IN PATIENTS (HUMAN AND NON-HUMAN)

Many methods are available for detecting specific alleles at polymorphic loci. The preferred method for detecting a specific polymorphic allele will depend, in part, upon the molecular nature of the polymorphism. For example, the various allelic forms of the polymorphic locus may differ by a single base-pair of the DNA. Such single nucleotide polymorphisms (or SNPs) are major contributors to genetic variation, comprising some 80% of all known polymorphisms, and their density in the human genome is estimated to be on average 1 per 1,000 base pairs. SNPs are most frequently biallelic—occurring in only two different forms (although up to four different forms of an SNP, corresponding to the four different nucleotide bases occurring in DNA, are theoretically possible). Nevertheless, SNPs are mutationally more stable than other polymorphisms, making them suitable for association studies in which linkage disequilibrium between markers and an unknown variant is used to map disease-causing mutations. In addition, because SNPs typically have only two alleles, they can be genotyped by a simple plus/minus assay rather than a length measurement, making them more amenable to automation.

A variety of methods are available for detecting the presence of a particular single nucleotide polymorphic allele in an individual. Advancements in this field have provided accurate, easy, and inexpensive large-scale SNP genotyping. Most recently, for example, several new techniques have been described including dynamic allele-specific hybridization (DASH), microplate array diagonal gel electrophoresis (MADGE), pyrosequencing, oligonucleotide-specific ligation, the TaqMan system as well as various DNA "chip" technologies such as the Affymetrix SNP chips. These methods require amplification of the target genetic region, typically by PCR. Still other newly developed methods, based on the generation of small signal molecules by invasive cleavage followed by mass spectrometry or immobilized padlock probes and rolling-circle amplification, might eventually eliminate the need for PCR. Several of the methods known in the art for detecting specific single nucleotide polymorphisms are summarized below. The method of the present invention is understood to include all available methods.

Several methods have been developed to facilitate analysis of single nucleotide polymorphisms. In one embodiment, the single base polymorphism can be detected by using a specialized exonuclease-resistant nucleotide, as disclosed, e.g., in Mundy, C. R. (U.S. Pat. No. 4,656,127). According to the method, a primer complementary to the allelic sequence immediately 3' to the polymorphic site is permitted to hybridize to a target molecule obtained from a particular animal or human. If the polymorphic site on the target molecule contains a nucleotide that is complementary to the particular exonuclease-resistant nucleotide derivative present, then that derivative will be incorporated onto the end of the hybridized primer. Such incorporation renders the primer resistant to exonuclease, and thereby permits its detection. Since the identity of the exonuclease-resistant derivative of the sample is known, a finding that the primer has become resistant to exonucleases reveals that the nucleotide present in the polymorphic site of the target molecule was complementary to that of the nucleotide derivative used in the reaction. This method has the advantage that it does not require the determination of large amounts of extraneous sequence data.

In another embodiment of the invention, a solution-based method is used for determining the identity of the nucleotide of a polymorphic site. Cohen, D. et al. (French Patent 2,650,840; PCT Appln. No. WO91/02087). As in the Mundy method of U.S. Pat. No. 4,656,127, a primer is employed that is complementary to allelic sequences immediately 3' to a polymorphic site. The method determines the identity of the nucleotide of that site using labeled dideoxynucleotide derivatives, which, if complementary to the nucleotide of the polymorphic site will become incorporated onto the terminus of the primer.

An alternative method, known as Genetic Bit Analysis or GBA™ is described by Goelet, P. et al. (PCT Appln. No. 92/15712). The method of Goelet, P. et al. uses mixtures of labeled terminators and a primer that is complementary to the sequence 3' to a polymorphic site. The labeled terminator that is incorporated is thus determined by, and complementary to, the nucleotide present in the polymorphic site of the target molecule being evaluated. In contrast to the method of Cohen et al. (French Patent 2,650,840; PCT Appln. No. WO91/02087) the method of Goelet, P. et al. is preferably a heterogeneous phase assay, in which the primer or the target molecule is immobilized to a solid phase.

Recently, several primer-guided nucleotide incorporation procedures for assaying polymorphic sites in DNA have been described (Komher, J. S. et al., Nucl. Acids. Res. 17:7779-7784 (1989); Sokolov, B. P., Nucl. Acids Res. 18:3671 (1990); Syvanen, A.-C., et al., Genomics 8:684-692 (1990); Kuppuswamy, M. N. et al., Proc. Natl. Acad. Sci. (U.S.A.) 88:1143-1147 (1991); Prezant, T. R. et al., Hum. Mutat. 1:159-164 (1992); Ugozzoli, L. et al., GATA 9:107-112 (1992); Nyren, P. et al., Anal. Biochem. 208:171-175 (1993). These methods differ from GBA™ in that they all rely on the incorporation of labeled deoxynucleotides to discriminate between bases at a polymorphic site. In such a format, since the signal is proportional to the number of deoxynucleotides incorporated, polymorphisms that occur in runs of the same nucleotide can result in signals that are proportional to the length of the run (Syvanen, A.-C., et al., Amer. J. Hum. Genet. 52:46-59 (1993)).

For mutations that produce premature termination of protein translation, the protein truncation test (PTT) offers an efficient diagnostic approach (Roest, et. al., (1993) Hum. Mol Genet. 2:1719-21; van der Luijt, et. al., (1994) Genomics 20:1-4). For PTT, RNA is initially isolated from available tissue and reverse-transcribed, and the segment of interest is amplified by PCR. The products of reverse transcription PCR are then used as a template for nested PCR amplification with a primer that contains an RNA polymerase promoter and a sequence for initiating eukaryotic translation. After amplification of the region of interest, the unique motifs incorporated into the primer permit sequential in vitro transcription and translation of the PCR products. Upon sodium dodecyl sulfate-polyacrylamide gel electrophoresis of translation products, the appearance of truncated polypeptides signals the presence of a mutation that causes premature termination of translation. In a variation of this technique, DNA (as opposed to RNA) is used as a PCR template when the target region of interest is derived from a single exon.

Any cell type or tissue may be utilized to obtain nucleic acid samples for use in the diagnostics described herein. In a preferred embodiment, the DNA sample is obtained from a bodily fluid, e.g, blood, obtained by known techniques (e.g. venipuncture) or saliva. Alternatively, nucleic acid tests can be performed on dry samples (e.g. hair or skin). When using RNA or protein, the cells or tissues that may be utilized must express an FOXO3A gene.

Diagnostic procedures may also be performed in situ directly upon tissue sections (fixed and/or frozen) of patient tissue obtained from biopsies or resections, such that no nucleic acid purification is necessary. Nucleic acid reagents may be used as probes and/or primers for such in situ procedures (see, for example, Nuovo, G. J., 1992, PCR in situ hybridization: protocols and applications, Raven Press, N.Y.).

In addition to methods which focus primarily on the detection of one nucleic acid sequence, profiles may also be assessed in such detection schemes. Fingerprint profiles may be generated, for example, by utilizing a differential display procedure, Northern analysis and/or RT-PCR.

A preferred detection method is allele specific hybridization using probes overlapping a region of at least one allele of an FOXO3A haplotype and having about 5, 10, 20, 25, or 30 nucleotides around the mutation or polymorphic region. In a preferred embodiment of the invention, several probes capable of hybridizing specifically to other allelic variants are attached to a solid phase support, e.g., a "chip" (which can hold up to about 250,000 oligonucleotides). Oligonucleotides can be bound to a solid support by a variety of processes, including lithography. Mutation detection analysis using these chips comprising oligonucleotides, also termed "DNA probe arrays" is described e.g., in Cronin et al. (1996) Human Mutation 7:244. In one embodiment, a chip comprises all the allelic variants of at least one polymorphic region of a gene. The solid phase support is then contacted with a test nucleic acid and hybridization to the specific probes is detected. Accordingly, the identity of numerous allelic variants of one or more genes can be identified in a simple hybridization experiment.

These techniques may also comprise the step of amplifying the nucleic acid before analysis. Amplification techniques are known to those of skill in the art and include, but are not limited to cloning, polymerase chain reaction (PCR), polymerase chain reaction of specific alleles (ASA), ligase chain reaction (LCR), nested polymerase chain reaction, self sustained sequence replication (Guatelli, J. C. et al., 1990, Proc. Natl. Acad. Sci. USA 87:1874-1878), transcriptional amplification system (Kwoh, D. Y. et al., 1989, Proc. Natl. Acad. Sci. USA 86:1173-1177), and Q-Beta Replicase (Lizardi, P. M. et al., 1988, Bio/Technology 6:1197).

Amplification products may be assayed in a variety of ways, including size analysis, restriction digestion followed by size analysis, detecting specific tagged oligonucleotide primers in the reaction products, allele-specific oligonucleotide (ASO) hybridization, allele specific 5' exonuclease detection, sequencing, hybridization, and the like.

PCR based detection means can include multiplex amplification of a plurality of markers simultaneously. For example, it is well known in the art to select PCR primers to generate PCR products that do not overlap in size and can be analyzed simultaneously. Alternatively, it is possible to amplify different markers with primers that are differentially labeled and thus can each be differentially detected. Of course, hybridization based detection means allow the differential detection of multiple PCR products in a sample. Other techniques are known in the art to allow multiplex analyses of a plurality of markers.

In a merely illustrative embodiment, the method includes the steps of (i) collecting a sample of cells from a patient (from saliva, cheek swab, blood or other body fluid or component), (ii) isolating nucleic acid (e.g., genomic, mRNA or both) from the cells of the sample, (iii) contacting the nucleic acid sample with one or more primers which specifically hybridize 5' and 3' to at least one allele of an FOXO3A haplotype under conditions such that hybridization and amplification of the allele occurs, and (iv) detecting the amplification product. These detection schemes are especially useful for the detection of nucleic acid molecules if such molecules are present in very low numbers.

In a preferred embodiment of the subject assay, the allele of an FOXO3A haplotype is identified by alterations in restriction enzyme cleavage patterns. For example, sample and control DNA is isolated, amplified (optionally), digested with one or more restriction endonucleases, and fragment length sizes are determined by gel electrophoresis.

In yet another embodiment, any of a variety of sequencing reactions known in the art can be used to directly sequence the allele. Exemplary sequencing reactions include those based on techniques developed by Maxim and Gilbert ((1977) Proc. Natl Acad Sci USA 74:560) or Sanger (Sanger et al (1977) Proc. Nat. Acad. Sci USA 74:5463). It is also contemplated that any of a variety of automated sequencing procedures may be utilized when performing the subject assays (see, for example Biotechniques (1995) 19:448), including sequencing by mass spectrometry (see, for example PCT publication WO 94/16101; Cohen et al. (1996) Adv Chromatogr 36:127-162; and Griffin et al. (1993) Appl Biochem Biotechnol 38:147-159). It will be evident to one of skill in the art that, for certain embodiments, the occurrence of only one, two or three of the nucleic acid bases need be determined in the sequencing reaction. For instance, A-track or the like, e.g., where only one nucleic acid is detected, can be carried out.

In a further embodiment, protection from cleavage agents (such as a nuclease, hydroxylamine or osmium tetroxide and with piperidine) can be used to detect mismatched bases in RNA/RNA or RNA/DNA or DNA/DNA heteroduplexes (Myers, et al. (1985) Science 230:1242). In general, the art technique of "mismatch cleavage" starts by providing heteroduplexes formed by hybridizing (labeled) RNA or DNA containing the wild-type allele with the sample. The double-stranded duplexes are treated with an agent which cleaves single-stranded regions of the duplex such as which will exist due to base pair mismatches between the control and sample strands. For instance, RNA/DNA duplexes can be treated with RNase and DNA/DNA hybrids treated with S1 nuclease to enzymatically digest the mismatched regions. In other embodiments, either DNA/DNA or RNA/DNA duplexes can be treated with hydroxylamine or osmium tetroxide and with piperidine in order to digest mismatched regions. After digestion of the mismatched regions, the resulting material is then separated by size on denaturing polyacrylamide gels to determine the site of mutation. See, for example, Cotton et al (1988) Proc. Natl Acad Sci USA 85:4397; and Saleeba et al (1992) Methods Enzymol. 217: 286-295. In a preferred embodiment, the control DNA or RNA can be labeled for detection.

In still another embodiment, the mismatch cleavage reaction employs one or more proteins that recognize mismatched base pairs in double-stranded DNA (so called "DNA mismatch repair" enzymes). For example, the mutt enzyme of E. coli cleaves A at G/A mismatches and the thymidine DNA glycosylase from HeLa cells cleaves T at G/T mismatches (Hsu et al. (1994) Carcinogenesis 15:1657-1662). According to an exemplary embodiment, a probe based on an allele of an FOXO3A locus haplotype is hybridized to a cDNA or other DNA product from a test cell(s). The duplex is treated with a DNA mismatch repair enzyme, and the cleavage products, if any, can be detected from electrophoresis protocols or the like See, for example, U.S. Pat. No. 5,459,039, which is incorporated by reference herein in its entirety.

In other embodiments, alterations in electrophoretic mobility will be used to identify an FOXO3A locus allele. For example, single strand conformation polymorphism (SSCP) may be used to detect differences in electrophoretic mobility between mutant and wild type nucleic acids (Orita et al. (1989) Proc Natl. Acad. Sci USA 86:2766, see also Cotton (1993) Mutat Res 285:125-144; and Hayashi (1992) Genet Anal Tech Appl 9:73-79). Single-stranded DNA fragments of sample and control FOXO3A locus alleles would be denatured and allowed to renature. The secondary structure of single-stranded nucleic acids varies according to sequence, the resulting alteration in electrophoretic mobility enables the detection of even a single base change. The DNA fragments may be labeled or detected with labeled probes. The sensitivity of the assay may be enhanced by using RNA (rather than DNA), in which the secondary structure is more sensitive to a change in sequence. In a preferred embodiment, the subject method utilizes heteroduplex analysis to separate double stranded heteroduplex molecules on the basis of changes in electrophoretic mobility (Keen et al. (1991) Trends Genet 7:5).

In yet another embodiment, the movement of alleles in polyacrylamide gels containing a gradient of denaturant is assayed using denaturing gradient gel electrophoresis (DGGE) (Myers et al. (1985) Nature 313:495). When DGGE is used as the method of analysis, DNA will be modified to insure that it does not completely denature, for example by adding a GC clamp of approximately 40 bp of high-melting GC-rich DNA by PCR. In a further embodiment, a temperature gradient is used in place of a denaturing agent gradient to identify differences in the mobility of control and sample DNA (Rosenbaum and Reissner (1987) Biophys Chem 265:12753).

Examples of other techniques for detecting alleles include, but are not limited to, selective oligonucleotide hybridization, selective amplification, or selective primer extension. For example, oligonucleotide primers may be prepared in which the known mutation or nucleotide difference (e.g., in allelic variants) is placed centrally and then hybridized to target DNA under conditions which permit hybridization only if a perfect match is found (Saiki et al. (1986) Nature 324:163); Saiki et al (1989) Proc. Natl Acad. Sci USA 86:6230). Such allele specific oligonucleotide hybridization techniques may be used to test one mutation or polymorphic region per reaction when oligonucleotides are hybridized to PCR amplified target DNA or a number of different mutations or polymorphic regions when the oligonucleotides are attached to the hybridizing membrane and hybridized with labelled target DNA.

Alternatively, the allele specific amplification technology, which depends on selective PCR amplification, may be used in conjunction with the instant invention. Oligonucleotides used as primers for specific amplification may carry the mutation or polymorphic region of interest in the center of the molecule (so that amplification depends on differential hybridization) (Gibbs et al (1989) Nucleic Acids Res. 17:2437-2448) or at the extreme 3' end of one primer where, under appropriate conditions, mismatch can prevent, or reduce polymerase extension (Prossner (1993) Tibtech 11:238. In addition it may be desirable to introduce a novel restriction site in the region of the mutation to create cleavage based detection (Gasparini et al (1992) Mol. Cell Probes 6:1). It is anticipated that in certain embodiments amplification may also be performed using Taq ligase for amplification (Barany (1991) Proc. Natl. Acad. Sci USA 88:189). In such cases, ligation will occur only if there is a perfect match at the 3' end of the 5' sequence making it possible to detect the presence of a known mutation at a specific site by looking for the presence or absence of amplification.

In another embodiment, identification of the allelic variant is carried out using an oligonucleotide ligation assay (OLA), as described, e.g., in U.S. Pat. No. 4,998,617 and in Landegren, U. et al. ((1988) Science 241:1077-1080). The OLA protocol uses two oligonucleotides which are designed to be capable of hybridizing to abutting sequences of a single strand of a target. One of the oligonucleotides is linked to a separation marker, e.g., biotinylated, and the other is detectably labeled. If the precise complementary sequence is found in a target molecule, the oligonucleotides will hybridize such that their termini abut, and create a ligation substrate. Ligation then permits the labeled oligonucleotide to be recovered using avidin, or another biotin ligand. Nickerson, D. A. et al. have described a nucleic acid detection assay that combines attributes of PCR and OLA (Nickerson, D. A. et al. (1990) Proc. Natl. Acad. Sci. USA 87:8923-27). In this method, PCR is used to achieve the exponential amplification of target DNA, which is then detected using OLA.

Several techniques based on this OLA method have been developed and could be used to detect alleles of an FOXO3a locus haplotype. For example, U.S. Pat. No. 5,593,826 discloses an OLA using an oligonucleotide having 3'-amino group and a 5'-phosphorylated oligonucleotide to form a conjugate having a phosphoramidate linkage. In another variation of OLA described in Tobe et al. ((1996) Nucleic Acids Res 24: 3728), OLA combined with PCR permits typing of two alleles in a single microtiter well. By marking each of the allele-specific primers with a unique hapten, i.e. digoxigenin and fluorescein, each OLA reaction can be detected by using hapten specific antibodies that are labeled with different enzyme reporters, alkaline phosphatase or horseradish peroxidase. This system permits the detection of the two alleles using a high throughput format that leads to the production of two different colors.

Another embodiment of the invention is directed to kits for detecting a likelihood for long life or the need for wellness or diagnostic intervention in the near future. This kit may contain one or more oligonucleotides, including 5' and 3' oligonucleotides that hybridize 5' and 3' to at least one allele of a FOXO3A locus haplotype. PCR amplification oligonucleotides should hybridize between 25 and 2500 base pairs apart, preferably between about 100 and about 500 bases apart, in order to produce a PCR product of convenient size for subsequent analysis.

Particularly preferred primers include nucleotide sequences described in SEQ IDs Nos. 2-9. Suitable primers for the detection of a human polymorphism in these genes can be readily designed using this sequence information and standard techniques known in the art for the design and optimization of primers sequences. Optimal design of such primer sequences can be achieved, for example, by the use of commercially available primer selection programs such as Primer 2.1, Primer 3 or GeneFisher.

An example of a simple method for the detection of the "GCC haplotype" involves the use of allele-specific primers that amplify the specific nucleotide of interest, similar to that described in paragraph [0067]. This method exploits the fact that oligonucleotide primers must be perfectly annealed at their 3' ends for a DNA polymerase to extend these primers during PCR. By designing oligonucleotide primers that match only a specific DNA point difference, such as that found in the rs2802292 polymorphisms—primers that do not bind the T-type allele—such primers can distinguish between polymorphic alleles. It is necessary to set up a control reaction in the same tube as the amplification refractory mutation system reaction (ARMS) to ensure that lack of product generation from a given sample is not simply due to failure of the PCR reaction rather than absence of the "G" variant that the assay is probing for. Oligonucleotides used for this purpose included forward outer ("rs2802292_FO"), 5'-GAAACTGAGGCTAACAGCTGGGTCTGGCCC-3' identified as SEQ ID No. 5; reverse outer ("rs2802292_RO"), 5'-AGCTGATGCTCCT-CAACGAAACCACCTTAC-3' identified as SEQ ID No. 6; reverse G-specific ("rs2802292_RG"), 5'-GGACCCCTT-CATCTGTCACACAGAGGCTcC-3' identified as SEQ ID No.7; and forward T-specific ("rs2802292_FT"), 5'-CTGTTGCTCACAAGAGCTCAGGGCTGGGcT-3' identified as SEQ ID No.8, where the underlined final base in the latter two primers anneals at the site of the G-T difference, whereas the 2nd bp from the 3' end (lowercase) is intentionally mismatched to maximize allelic specificity. The four primers in this illustrative example are set forth in Table No. 9.

TABLE 9

Primers for Identification of the rs2802292 G-T Polymporphism

| Primer | Sequence |
| --- | --- |
| forward outer "rs2802292_FO" | 5'-GAAACTGAGGCTAACAGCTGGGTCTGGCCC-3' |
| reverse outer "rs2802292_RO" | 5'-AGCTGATGCTCCTCAACGAAACCACCTTAC-3' |
| reverse G-specific "rs2802292_RG" | 5'-GGACCCCTTCATCTGTCACACAGAGGCTcC-3' |
| forward T-specific "rs2802292_FT" | 5'-CTGTTGCTCACAAGAGCTCAGGGCTGGGcT-3' |

(Table 9 discloses SEQ ID NOS 5-8 respectively, in order of appearance)

The DNA Sequence of PCR Product Denoting Primers and G/T Variants (source Genbank AL391646.12) is as follows:

GAAACTGAGGCTAACAGCTGGGTCTGGCCCATGACTGGTTCAGTTGGTAT

TTGGTGGACCAAGTTGACCAAGCTCACCCAGCTTCTGAGTGACAGAGTGA

ATATAAACCCAGCCTGCTCACTCCATTTCCTAGTTTTCTCACCTCTACCA

GGGTCT*CTGTTGCTCACAAGAGCTCAGGGCTGGGA*(*T/G*)*AAGCCTCTGT*

*GTGACAGATGAAGGGGTCCTGCTGCTCTCTAGGGAAGAATCGGTCCCAAA*

TTGCTCAAGGGAGTAAGGTGGTTTCGTTGAGGAGCATCAGCT, identified as SEQ ID No. 9.

When amplicons generated in this way are resolved in an agarose gel, the G-type primers can be shown to have generated a 186-bp product, whereas the T-type primers give a 132-bp product. The outside primers generate a 288-bp product that must be present in every reaction in order to guarantee the reaction has proceeded accurately.

Representative reagents and conditions for the amplification are shown in Table 10.

TABLE 10

PCR conditions for Identification of rs2802292 G-T Polymorphism

| Reagent | Final Concentration | Vendor |
| --- | --- | --- |
| AmpliTaq Gold PCR Buffer | 1 X | Perkin-Elmer |
| dNTPs | 200 µM | Perkin-Elmer |
| MgCl$_2$ | 1.5 mM | Perkin-Elmer |
| "rs2802292_FO" | 1.0 µM | see above |
| "rs2802292_FT" | 1.0 µM | see above |
| "rs2802292_RG" | 0.5 µM | see above |
| "rs2802292_FT" | 0.5 µM | see above |
| "AmpliTaq Gold" | 0.6 U | Perkin-Elmer |
| Human DNA | 5-10 ng/µL | |
| H$_2$O | to volume | |

The PCR conditions include 15 minutes at 94° C. followed by 30 cycles of 94° C. for 30 seconds, 60° C. for 30 seconds, 72° C. for 30 seconds, then a final incubation at 72° for 7 minutes. The results shown in the example were performed on an MJ Research model "PTC200" thermocycler.

The amplified fragments can be resolved on a 3% agarose gel as shown in FIG. 1. FIG. 1 gives the results of an ARMS-PCR assay to detect the FOXO3A G/T variants using the primers and conditions described above. Track 1 shows a subject homozygous for the "T" allele (132 bp); tracks 2 and 3 show subjects who are homozygous for the "G" allele (186 bp); and tracks 4 and 5 show subjects who are heterozygous for the "T" and "G" alleles (132+186 bp) and M is the 100 bp DNA ladder (Invitrogen, Paisley, United Kingdom).

Figure 2:
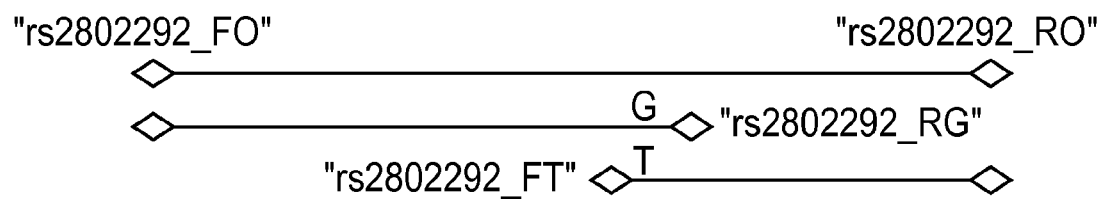
FIG. 2 illustrates the schematic outline of the ARMS-PCR assay to detect the FOXO3A G/T variants using the primers described in Table 10.

In summary, FIG. 2 shows a schematic outline of the assay. Primers "rs2802292_FO" and "rs2802292_RO" flank the polymorphic locus rs2802292 and should generate a control 288-bp band in all cases. Primers "rs2802292_OF" and "rs2802292_RG" generate a 186-bp G-specific product and primers "rs2802292_FT" and "rs2802292_OR" generate a 132-bp T-specific product.

For use in a kit, oligonucleotides may be any of a variety of natural and/or synthetic compositions such as synthetic oligonucleotides, restriction fragments, cDNAs, synthetic peptide nucleic acids (PNAs), and the like. The assay kit and method may also employ labeled oligonucleotides to allow ease of identification in the assays. Examples of labels which may be employed include radio-labels, enzymes, fluorescent compounds, streptavidin, avidin, biotin, magnetic moieties, metal binding moieties, antigen or antibody moieties, and the like.

The kit may, optionally, also include DNA sampling means. DNA sampling means are well known to one of skill in the art and can include, but not be limited to substrates, such as filter papers, the AmpliCard™ (University of Sheffield, Sheffield, England S10 2J F; Tarlow, J W, et al., J of Invest. Dermatol. 103:387-389 (1994)) and the like; DNA purification reagents such as Nucleon™ kits, lysis buffers, proteinase solutions and the like; PCR reagents, such as reaction buffers, thermostable polymerase, dNTPs, and the like; and allele detection means such as the HinfI restriction enzyme, allele specific oligonucleotides, degenerate oligonucleotide primers for nested PCR from dried blood.

C. PHARMACOGENOMICS

Knowledge of the particular alleles associated with a susceptibility to developing a particular disease or condition, alone or in conjunction with information on other genetic defects contributing to the particular disease or condition allows a customization of the prevention or treatment in accordance with the individual's genetic profile, the goal of "pharmacogenomics". Thus, comparison of an individual's FOXO3A profile to the population profile for healthy aging, permits the selection or design of drugs or other therapeutic regimens that are expected to be safe and efficacious for a particular patient or patient population (i.e., a group of patients having the same genetic alteration).

Knowledge of the particular alleles described in this invention can be used to examine differences in cell behavior in cell cultures and tissue systems and measure the response of the cells to chemicals or biological agents that are added to the cell or tissue culture systems. Differences in cell behavior and responses can be compared between the genotypes in order to identify drugs or other pharmacologic agents that may be implemented in the desire to improve health or extend lifespan or to test new compounds for toxicity or potential effects on genes or gene expression.

In addition, the ability to target populations expected to show the highest clinical benefit, based on genetic profile can enable: 1) the repositioning of already marketed drugs; 2) the rescue of drug candidates whose clinical development has been discontinued as a result of safety or efficacy limitations, which are patient subgroup-specific; and 3) an accelerated and less costly development for candidate therapeutics and more optimal drug labeling (e.g. since measuring the effect of various doses of an agent on the causative mutation is useful for optimizing effective dose).

The treatment of an individual with a particular therapeutic agent can be monitored by measuring the level of expression for a gene associated with longevity. The level of expression can be measured by determining protein (e.g. FOXO3A), mRNA and/or transcriptional level. Depending on the level detected, the therapeutic regimen can then be maintained or adjusted (increased or decreased in dose). In a preferred embodiment, the effectiveness of treating a subject with an agent comprises the steps of: (i) obtaining a pre-administration sample from a subject prior to administration of the agent; (ii) detecting the level or amount of a protein, mRNA or genomic DNA in the pre-administration sample; (iii) obtaining one or more post-administration samples from the subject after administration of the therapeutic agent; (iv) detecting the level of expression or activity of the protein, mRNA or genomic DNA in the post-administration sample; (v) comparing the level of expression or activity of the protein, mRNA or genomic DNA in the pre-administration sample with the corresponding protein, mRNA or genomic DNA in the post-administration sample, respectively; and (vi) altering the administration of the agent to the subject accordingly.

Cells of a subject may also be obtained before and after administration of a therapeutic to detect the level of expression of genes other than a FOXO3A gene to verify that the therapeutic does not increase or decrease the expression of genes which could be deleterious. This can be done, e.g., by using the method of transcriptional profiling. Thus, mRNA from cells exposed in vivo to a therapeutic and mRNA from the same type of cells that were not exposed to the therapeutic could be reverse transcribed and hybridized to a chip containing DNA from numerous genes, to thereby compare the expression of genes in cells treated and not treated with the therapeutic.

The "GCC" haplotype can be used in risk calculators to aid in the prediction of death and age-associated diseases (heart disease, stroke, cancer, COPD or other chronic lung disease, Parkinson disease, and diabetes and dementia) and future physical function (ability to walk, cognitive function). This information is of interest to the public, physicians, health care companies and insurance companies. Examples of known risk calculators include the system and method disclosed in Perls, U.S. Patent Application Publication No. US 2007/0118398 A1, published on May 24, 2007, which is incorporated by reference herein in its entirety. Risk calculators can be provided in for example, a physician's office, as a handheld or online. An individual, health-care professional, insurance company, health care organization interested in predicting how long someone will live may enter his/her genotype into a computer and obtains a risk score for aging-related disease, number of healthy years of life left, and number of total remaining years of life.

Based on a particular score, a physician or health professional may advise the patient on healthy living or risk reduction for the above diseases and death, particularly for persons with the less protective versions of the FOXO3A gene. Some exemplary options include: advice concerning food choices (e.g. red wine, soy products, and other foods that contain compounds that may affect the activity of the FOXO3A gene) or intensive risk factor modification such as weight loss or increased physical activity.

The identification of FOXO3A and in particular the GCC haplotype as predictors of healthy aging and longevity provides a probable source of useful biologics and targets for pharmaceutical screens and testing. For example, one may take the gene product or a synthetic version of the protein or other active compound produced by FOXO3A gene for anticipated health benefits in reduction of age-related diseases. Means of taking the gene product may include ingestion, injection, transdermal administration and other methods well known in the pharmaceutical arts. Compounds can be screened to find those that affect the type, activity, or the amount of the gene product produced by FOXO3A, in particular, the GCC haplotype.

The invention includes methods of modulating FOXO3A to prevent or treat age-related diseases. The invention also includes methods for treating or preventing a disease or condition in which FOXO3A is implicated, e.g. age-related diseases or enhancing longevity in a subject. "Subject," as used herein, refers to human and non-human animals. The term "non-human animals" includes all vertebrates, e.g., mammals, such as non-human primates (particularly higher primates), farm mammals such as horses, cows, bison, buffalo, goats, pigs and sheep, chicken, ducks and geese, companion animals such as dogs, cats, rabbits, guinea pigs, rodents, and reptiles, and laboratory animals. In a preferred embodiment, the subject is human. In another embodiment, the subject is an experimental animal or transgenic animal suitable as a disease model. Methods of modulating and treatment are well known to those skilled in the art as set forth in Geesaman et al., U.S. Patent Application Publication No. US 2007/0105109 A1, published on May 10, 2007, which is incorporated by reference herein in its entirety.

Many other diagnostic and therapeutic uses of the sequences or gene products of the allelic variations taught by this invention will be evident to those skilled in the art. Some examples include use in small molecule screens, antisense oligonucleotides, double stranded small interfering RNAs (siRNAs) will be evident to those skilled in the art. Several approaches to developing diagnostic and therapeutic uses concerning FOXO activity are described in Goldberg et al., U.S. Patent Application No. US 2006/0069049 A1, published on Mar. 30, 2006, and concerning related pathways in Tissenbaum et al., U.S. Patent Application No. US 2006/0272039, published on Nov. 30, 2006, both of which are incorporated by reference herein in their entirety.

The foregoing written specification is considered to be sufficient to enable one skilled in the art to practice the invention. The skilled worker knows, or can identify by using simply routine methods, a large number of equivalents of the specific embodiments of the invention. These equivalents are intended to be included in the patent claims below. Indeed, various modifications of the invention in addition to those shown and described herein will become apparent to those skilled in the art from the foregoing description and fall within the scope of the appended claims.

REFERENCES NOT LISTED IN THE TEXT

1. Herskind A M et al. (1996). The heritability of human longevity: a population-based study of 2872 Danish twin pairs born 1870-1900. *Hum Genet* 97:319-323.
2. Yashin A I, Iachine I A, Harris J R (1999) Half of variation in susceptibility to mortality is genetic: findings from Swedish twin survival data. *Behav Genet* 29:11-19.
3. Christensen K, Johnson T E, Vaupel J W (2006) The quest for genetic determinants of human longevity: challenges and insights. *Nat Rev Genet* 7:436-448.
4. Willcox D C, Willcox B J, Hsueh W C, Suzuki M (2006) Genetic determinants of exceptional human longevity: insights from the Okinawa Centenarian Study. *AGE* 28:313-332.
5. Bishop N A, Guarente L (2007) Genetic links between diet and lifespan: shared mechanisms from yeast to humans. *Nat Rev Genet* 8:835-844.
6. Risch N, Zhang H (1995) Extreme discordant sib pairs for mapping quantitative trait loci in humans. *Science* 268:1584-1589.
7. Gundmundsson H et al. (2000) Inheritance of human longevity in Iceland. *Eur J Hum Genet* 8:743-749.
8. Kerber R A, O'Brien E, Smith K R, Cawthon R M (2001) Familial excess longevity in Utah genealogies. *J Gerontol A Biol Sci Med Sci* 56:B130-B139.
9. Perls T T et al. (2002) Life-long sustained mortality advantage of siblings of centenarians. *Proc Natl Acad Sci USA* 99:8442-8447.
10. Willcox B J, Willcox D C, He Q, Curb J D, Suzuki M (2006) Siblings of Okinawan centenarians exhibit lifelong mortality advantages. *J Gerontol A Biol Med Sci* 61:345-354.
11. Partridge L (2007) Some highlights of research on aging with invertebrates, 2006-2007. *Aging Cell* 6:595-598.
12. Ghazi A, Henis-Korenblit S, Kenyon C (2007) Regulation of *Caenorhabditis elegans* lifespan by a proteasomal E3 ligase complex. *Proc Natl Acad Sci USA* 104:5947-5952.
13. Bartke A (2008) New findings in gene knockout, mutant and transgenic mice. *Exp Gerontol* 43:11-14.
14. Lin K, Dorman J B, Rodan A, Kenyon C (1997) daf-16: An HNF-3/forkhead family member that can function to double the life-span of *Caenorhabditis elegans*. *Science* 278:1319-1322.
15. Brunet A et al. (2004) Stress-dependent regulation of FOXO transcription factors by the SIRT1 deacetylase. *Science* 303:2011-2015.
16. Kenyon C, Murphy C T (2006) Enrichment of regulatory motifs upstream of predicted DAF-16 targets. *Nat Genet* 38:397-398.
17. van der Horst A, Burgering B M (2007) Stressing the role of FOXO proteins in lifespan and disease. *Nat Rev Mol Cell Biol* 8:440-450.
18. Russell S J, Kahn C R (2007) Endocrine regulation of ageing. *Nat Rev Mol Cell Biol* 8:681-691.
19. Sauve A A, Wolberger C, Schramm V L, Boeke J D (2006) The biochemistry of Sirtuins. *Ann Rev Biochem* 75:435-465.
20. Tissenbaum H A, Guarente L (2001) Increased dosage of a sir-2 gene extends lifespan in *Caenorhabditis elegans*. *Nature* 410:227-230.
21. Blüher M, Kahn B B, Kahn C R (2003) Extended longevity in mice lacking the insulin receptor in adipose tissue. *Science* 299:572-574.
22. Bartke A (2008) Impact of reduced insulin-like growth factor-1/insulin signaling on aging in mammals: novel findings. *Aging Cell* 7:285-290.
23. White M F (2003) Insulin signaling in health and disease. *Science* 302:1710-1711.
24. Conover C A, Bale L K (2007) Loss of pregnancy-associated plasma protein A extends lifespan in mice. *Aging Cell* 6:727-729.
25. Curran S P, Ruvkun G (2007) Lifespan regulation by evolutionarily conserved genes essential for viability. *PLoS Genet* 3:e56.
26. Greer E L et al. (2007) An AMPK-FOXO pathway mediates the extension of lifespan induced by a novel method of dietary restriction in *C. elegans*. *Curr Biol* 17:1646-1656.
27. Berdichevsky A, Viswanathan M, Horvitz H R, Guarente L (2006) *C. elegans* SIR-2.1 interacts with 14-3-3 proteins to activate DAF-16 and extend life span. *Cell* 125:1165-1177.
28. Boehm M, Slack F (2005) A developmental timing MicroRNA and its target regulate life span in *C. elegans*. *Science* 310:1954-1957.
29. Hsu A L, Murphy C T, Kenyon C (2003) Regulation of aging and age-related disease by DAF-16 and heat-shock factor. *Science* 300:1142-1145.
30. Murphy C T (2006) The search for DAF-16/FOXO transcriptional targets: approaches and discoveries. *Exp Gerontol* 41:910-921.
31. Wang M C, Bohmann D, Jasper H (2005) JNK extends lifespan and limits growth by antagonizing cellular and organism-wide responses to insulin signaling. *Cell* 121:115-125.
32. Giannakou M E et al. (2007) Dynamics of the action of dFOXO on adult mortality in *Drosophila*. *Aging Cell* 6:429-438.
33. Harman D (1956) Aging: a theory based on free radical and radiation chemistry. *J Gerontol* 11:298-300.
34. Beckman K B, Ames B N (1998) The free radical theory of aging matures. *Physiol Rev* 78:547-581.
35. Fusco D, Colloca G, Lo Monaco M R, Cesari M (2007) Effects of antioxidant supplementation on the aging process. *Clin Interv Aging* 2:377-387.
36. Bonafe M et al. (2003) Polymorphic variants of IGF-I receptor and phosphoinositide 3-kinase genes affect IGF-I plasma levels and human longevity: cues for an evolutionarily conserved mechanism of life span control. *J Clin Endocrinol Metab* 88:3299-3304.
37. Kojima et al. (2004) Association analysis between longevity in the Japanese population and polymorphic variants of genes involved in insulin and insulin-like growth factor 1 signaling pathways. *Exp Gerontol* 39:1595-1598.
38. Suh Y et al. (2008) Functionally significant insulin-like growth factor I receptor mutations in centenarians. *Proc Natl Acad Sci USA* 105:3438-3439.
39. Kuningas M et al. (2007) Haplotypes in the human FOXO1a and FOXO3a genes: impact on disease and mortality at old age. *Eur J Hum Genet* 15:294-301.

40. Lunetta K L et al. (2007) Genetic correlates of longevity and selected age-related phenotypes: a genome-wide association study in the Framingham Study. *BMC Med Genet* 8 Supple 1: S13.
41. Nebel A et al. (2005) No association between microsomal triglyceride transfer protein (MTP) haplotype and longevity in humans. *Proc Natl Acad Sci USA* 102: 7906-7909.
42. Arai Y et al. (2001) Serum insulin like growth factor 1 (IGF-1) in centenarians: implication of IGF-1 as a turnover protein. *J Gerontol A Biol Sci Med Sci* 56A:M79-M82.
43. Teng E L et al. (1994) The Cognitive Abilities Screening Instrument (CAST): a practical test for cross-cultural epidemiological studies of dementia. *Int Psychogeriatr* 6:45-58.
44. Willcox B J et al. (2006) Midlife risk factors and survival in men. *JAMA* 296:2343-2350.
45. Kramarow E, Lubitz J, Lentzner H, Gorina Y (2007) Trends in the health of older Americans, 1970-2005. *Health Aff (Millwood)* 26:1417-1425.
46. Evert J, Lawler E, Bogan H, Perls T (2003) Morbidity profiles of centenarians: survivors, delayers, and escapers. *J Gerontol A Biol Sci Med Sci* 58:232-237.
47. Bernstein A M et al. (2004) First autopsy study of an Okinawan centenarian: absence of many age-related diseases. *J Gerontol A Biol Sci Med Sci* 59:1195-1199.
48. Willcox D C et al. (2007) Aging gracefully: a retrospective analysis of functional status in Okinawan centenarians. *Am J Geriatr Psychiatry* 15:252-256.
49. Terry D F, Wilcox M A, McCormick M A, Perls T T (2004) Cardiovascular disease delay in centenarian offspring. *J Gerontol A Biol Sci Med Sci* 59:385-389.
50. Rodriguez B L et al. (2002) The A.D.A and W.H.O. classifications for diabetes: their impact on diabetes prevalence and total and cardiovascular disease mortality in elderly Japanese-American men. *Diabetes Care* 25:951-955.
51. McNeely M J, Boyko E J (2004) Type 2 diabetes prevalence in Asian Americans: results of a national health survey. *Diabetes Care* 27:66-69.
52. Fujimoto W Y et al. (1995) Susceptibility to development of central adiposity among populations. *Obes Res* 3Suppl 2:179S-186S.
53. Examination Committee of Criteria for 'Obesity Disease' in Japan, et al. (2002). New criteria for 'obesity disease' in Japan. *Circ J* 66:987-992.
54. Barthel A, Schmoll D, Unterman T G (2005). FoxO proteins in insulin action and metabolism. *Trends Endocrinol Metab* 16:183-189.
55. Kops J G et al. (2002) Forkhead transcription factor FOXO3a protects quiescent cells from oxidative stress. *Nature* 419:316-321.
56. Youngman L D, Park J Y, Ames B N (1992) Protein oxidation associated with aging is reduced by dietary restriction of protein or calories. *Proc Natl Acad Sci USA* 89:9112-9116.
57. Heilbronn L K et al. (2006) Effect of 6-month calorie restriction on biomarkers of longevity, metabolic adaptation, and oxidative stress in overweight individuals: a randomized controlled trial. *JAMA* 295:1539-1548.
58. Selman C et al. (2008) Evidence for lifespan extension and delayed age-related biomarkers in insulin receptor substrate 1 null mice. *FASEB J*22:807-818.
59. Murphy C T et al. (2003) Genes that act downstream of DAF-16 to influence the lifespan of *Caenorhabditis elegans*. *Nature* 424:277-283.
60. Kuningas M et al. (2007) SIRT1 gene, age-related diseases, and mortality: the Leiden 85-plus study. *J Gerontol A Biol Sci Med Sci* 62:960-965.
61. Kagan A. Ed (1996) *The Honolulu Heart Program: An Epidemiological Study of Coronary Heart Disease and Stroke* (Harwood Academic Publishers, the Netherlands).
62. Worth R M, Kagan A (1970) Ascertainment of men of Japanese ancestry in Hawaii through World War II Selective Service registration. *J Chronic Dis* 23:389-397.
63. Rodriguez B L, Curb J D (1998) Cardiovascular risk factors in the elderly: the Honolulu Heart Program. *Cardiovasc Risk Factors* 8:99-103.
64. White L, et al. (1996) Prevalence of dementia in Japanese-American men living in Hawaii: the Honolulu-Asia Aging Study. *JAMA* 276:955-960.
65. National Institutes of Health (NIH): U.S. Department of Health and Human Services, NIH, National Institute on Aging (2001) *Report of the National Institute on Aging Advisory Panel on Exceptional Longevity (APEL)*. NIH Pub 01-4951 (NIH, Washington, D.C.).
66. Arias E (2006) *United States life tables*, 2003 (National Center for Health Statistics, Hyattsville, Md.), vol. 54, no. 14.
67. Nordyke E C, Lee R, Gardner R W (1984) A profile of Hawaii's elderly population. *Papers East West Popul Inst* 91:13-14.
68. Mehta C, Patel N (2001) *StatXact* 5 (CYTEL Software Corporation, Cambridge, Mass.).
69. SAS Institute, Inc. (1990) *SAS/STAT user's guide, version* 6 (SAS Institute, Cary, N.C.).
70. Sherry S T, Ward M H, Kholodov M, Baker J, Phan L, Smigiclski E M, Sirotkin K. dbSNP: the NCBI database of genetic variation. Nucleic Acids Res. 2001 Jan. 1; 29(1):308-11.)

What is claimed is:

1. A method of monitoring FOXO3A GCC allele expression, the method comprising:
   a) obtaining a pre-administration cell sample from a subject prior to administration of a therapeutic agent;
   b) detecting the level of FOXO3A GCC allele expression in the pre-administration sample;
   c) obtaining at least one post-administration sample from the subject; and
   d) detecting the level of FOXO3A GCC allele expression in the at least one post-administration sample,
      wherein detecting the level of FOXO3A allele expression in the samples comprises:
      detecting at least one "G" allele of the locus/polymorphism rs2802292 in the FOXO3A gene at the position corresponding to position 467 of SEQ ID NO: 4;
      detecting at least one "C" allele of the locus/polymorphism rs13217795 in the FOXO3A gene at the position corresponding to position 301 of SEQ ID NO: 3;
      detecting at least one "C" allele of the locus/polymorphism rs2764264 in the FOXO3A gene at the position corresponding to position 501 of SEQ ID NO: 2;
      wherein the "G" allele of rs2802292, the "C" allele of rs13217795, and the "C" allele of rs276424 constitute a GCC haplotype of a FOXO3 A gene, and expression from the FOXO3 A gene comprising the GCC haplotype is detected.

2. The method of claim 1, wherein the detecting includes the production of amplification products of at least one synthetic primer and furthermore wherein the at least one synthetic primer or the amplification products are detectably labeled.

3. The method of claim 2, wherein the at least one synthetic primer or amplification products are detectably labeled with a label, wherein the label is at least one of radio-labels, enzymes, fluorescent compounds, streptavidin, avidin, biotin, magnetic moieties, metal binding moieties, antigen or antibody moieties and mixtures thereof.

4. A method of monitoring FOXO3A GCC allele expression, the method comprising:
   a) obtaining a pre-administration cell sample from a subject prior to administration of a therapeutic agent;
   b) detecting the level of FOXO3A GCC allele expression in the pre-administration sample;
   c) obtaining at least one post-administration sample from the subject; and
   d) detecting the level of FOXO3A GCC allele expression in the at least one post-administration sample, wherein detecting the level of FOXO3A allele expression in the samples comprises:
   detecting at least one "G" allele of the locus/polymorphism rs2802292 in the FOXO3A gene at the position corresponding to position 467 of SEQ ID NO: 4;
   detecting at least one "C" allele of the locus/polymorphism rs13217795 in the FOXO3A gene at the position corresponding to position 301 of SEQ ID NO: 3;
   detecting at least one "C" allele of the locus/polymorphism rs2764264 in the FOXO3A gene at the position corresponding to position 501 of SEQ ID NO: 2;
   wherein the "G" allele of rs2802292, the "C" allele of rs13217795, and the "C" allele of rs276424 constitute a GCC haplotype of a FOXO3A gene, and expression from the FOXO3A gene comprising the GCC haplotype is detected; and
   furthermore wherein a nucleic acid assay is used to detect the level of FOXO3A GCC allele and wherein the nucleic acid assay uses at least one synthetic primer.

5. The method of claim 4, wherein the at least one synthetic primer is detectably labeled.

6. The method of claim 4, wherein the at least one synthetic primer is affixed to a solid support.

7. The method of claim 4, wherein the at one least synthetic primer has a sequence comprising SEQ ID NO. 7.

8. The method of claim 4, wherein the nucleic acid assay includes the production of amplification products of the at least one synthetic primer and furthermore wherein the amplification products are detectably labeled.

9. The method of claim 8, wherein the amplification products are cDNA.

10. The method of claim 8, wherein the amplification products are detectably labeled with a label, wherein the label is at least one of radio-labels, enzymes, fluorescent compounds, streptavidin, avidin, biotin, magnetic moieties, metal binding moieties, antigen or antibody moieties and mixtures thereof.

* * * * *

SEQUENCE LISTING

```
<160> NUMBER OF SEQ ID NOS: 9

<210> SEQ ID NO 1
<211> LENGTH: 673
<212> TYPE: PRT
<213> ORGANISM: Homo sapiens

<400> SEQUENCE: 1

Met Ala Glu Ala Pro Ala Ser Pro Ala Pro Leu Ser Pro Leu Glu Val
1               5                   10                  15

Glu Leu Asp Pro Glu Phe Glu Pro Gln Ser Arg Pro Arg Ser Cys Thr
            20                  25                  30
```

-continued

```
Trp Pro Leu Gln Arg Pro Glu Leu Gln Ala Ser Pro Ala Lys Pro Ser
        35                  40                  45

Gly Glu Thr Ala Ala Asp Ser Met Ile Pro Glu Glu Asp Asp Glu
 50                  55                  60

Asp Asp Glu Asp Gly Gly Arg Ala Gly Ser Ala Met Ala Ile Gly
 65                  70                  75                  80

Gly Gly Gly Gly Ser Gly Thr Leu Gly Ser Gly Leu Leu Glu Asp
                     85                  90                  95

Ser Ala Arg Val Leu Ala Pro Gly Gly Gln Asp Pro Gly Ser Gly Pro
                100                 105                 110

Ala Thr Ala Ala Gly Gly Leu Ser Gly Gly Thr Gln Ala Leu Leu Gln
                115                 120                 125

Pro Gln Gln Pro Leu Pro Pro Pro Gln Pro Gly Ala Ala Gly Gly Ser
                130                 135                 140

Gly Gln Pro Arg Lys Cys Ser Ser Arg Arg Asn Ala Trp Gly Asn Leu
145                 150                 155                 160

Ser Tyr Ala Asp Leu Ile Thr Arg Ala Ile Glu Ser Ser Pro Asp Lys
                165                 170                 175

Arg Leu Thr Leu Ser Gln Ile Tyr Glu Trp Met Val Arg Cys Val Pro
                180                 185                 190

Tyr Phe Lys Asp Lys Gly Asp Ser Asn Ser Ser Ala Gly Trp Lys Asn
                195                 200                 205

Ser Ile Arg His Asn Leu Ser Leu His Ser Arg Phe Met Arg Val Gln
                210                 215                 220

Asn Glu Gly Thr Gly Lys Ser Ser Trp Trp Ile Ile Asn Pro Asp Gly
225                 230                 235                 240

Gly Lys Ser Gly Lys Ala Pro Arg Arg Arg Ala Val Ser Met Asp Asn
                245                 250                 255

Ser Asn Lys Tyr Thr Lys Ser Arg Gly Arg Ala Ala Lys Lys Lys Ala
                260                 265                 270

Ala Leu Gln Thr Ala Pro Glu Ser Ala Asp Asp Ser Pro Ser Gln Leu
                275                 280                 285

Ser Lys Trp Pro Gly Ser Pro Thr Ser Arg Ser Ser Asp Glu Leu Asp
                290                 295                 300

Ala Trp Thr Asp Phe Arg Ser Arg Thr Asn Ser Asn Ala Ser Thr Val
305                 310                 315                 320

Ser Gly Arg Leu Ser Pro Ile Met Ala Ser Thr Glu Leu Asp Glu Val
                325                 330                 335

Gln Asp Asp Asp Ala Pro Leu Ser Pro Met Leu Tyr Ser Ser Ser Ala
                340                 345                 350

Ser Leu Ser Pro Ser Val Ser Lys Pro Cys Thr Val Glu Leu Pro Arg
                355                 360                 365

Leu Thr Asp Met Ala Gly Thr Met Asn Leu Asn Asp Gly Leu Thr Glu
                370                 375                 380

Asn Leu Met Asp Asp Leu Leu Asp Asn Ile Thr Leu Pro Pro Ser Gln
385                 390                 395                 400

Pro Ser Pro Thr Gly Gly Leu Met Gln Arg Ser Ser Ser Phe Pro Tyr
                405                 410                 415

Thr Thr Lys Gly Ser Gly Leu Gly Ser Pro Thr Ser Ser Phe Asn Ser
                420                 425                 430

Thr Val Phe Gly Pro Ser Ser Leu Asn Ser Leu Arg Gln Ser Pro Met
                435                 440                 445
```

```
Gln Thr Ile Gln Glu Asn Lys Pro Ala Thr Phe Ser Ser Met Ser His
    450                 455                 460
Tyr Gly Asn Gln Thr Leu Gln Asp Leu Leu Thr Ser Asp Ser Leu Ser
465                 470                 475                 480
His Ser Asp Val Met Met Thr Gln Ser Asp Pro Leu Met Ser Gln Ala
                485                 490                 495
Ser Thr Ala Val Ser Ala Gln Asn Ser Arg Arg Asn Val Met Leu Arg
            500                 505                 510
Asn Asp Pro Met Met Ser Phe Ala Ala Gln Pro Asn Gln Gly Ser Leu
        515                 520                 525
Val Asn Gln Asn Leu Leu His His Gln His Gln Thr Gln Gly Ala Leu
530                 535                 540
Gly Gly Ser Arg Ala Leu Ser Asn Ser Val Ser Asn Met Gly Leu Ser
545                 550                 555                 560
Glu Ser Ser Ser Leu Gly Ser Ala Lys His Gln Gln Ser Pro Val
                565                 570                 575
Ser Gln Ser Met Gln Thr Leu Ser Asp Ser Leu Ser Gly Ser Ser Leu
            580                 585                 590
Tyr Ser Thr Ser Ala Asn Leu Pro Val Met Gly His Glu Lys Phe Pro
    595                 600                 605
Ser Asp Leu Asp Leu Asp Met Phe Asn Gly Ser Leu Glu Cys Asp Met
610                 615                 620
Glu Ser Ile Ile Arg Ser Glu Leu Met Asp Ala Asp Gly Leu Asp Phe
625                 630                 635                 640
Asn Phe Asp Ser Leu Ile Ser Thr Gln Asn Val Val Gly Leu Asn Val
                645                 650                 655
Gly Asn Phe Thr Gly Ala Lys Gln Ala Ser Ser Gln Ser Trp Val Pro
            660                 665                 670
Gly

<210> SEQ ID NO 2
<211> LENGTH: 1001
<212> TYPE: DNA
<213> ORGANISM: Homo sapiens

<400> SEQUENCE: 2
tatttcactg gccaggacct ccaatacatt gttgaatagc agtggtgaaa gcagagatcc      60
ttaccatttt tctcatctta aggggaaagc attcagtctt tcactgttaa gtatcatgtt     120
aggtgtaagt ttgtcacata tttcctttat caggctgagg tagttttctc tattcctatg     180
tgttgagtag ttttttgtttt ttaaattatg agtggatatt gaattttgtc agatgctttt    240
tcctcacctg ttgagaagat cagatggttt ttcttttttca gtcttttaat atgatgaaat    300
acattgactg atttgcaatg ttaaaccaac cttacattcc tgggataaat cccacctggt    360
cttgatatgt taccatgaga ttcaagtagc taaaattttg ttaaggattt ttgtgtctgt    420
cttcatgagg aatattgatc tatacatttc ttataatatc tttgcctgtt tttggtacca    480
gggtaatggt ggtcttataa yatgagttgg aaagtgttcc ctgttctgct ctggtagcac    540
tgtagtatct cttccttaaa tgtttggtag aattcaacgg cagttaagcc atcagagcct    600
ggagtttttt tgtgtgtgag gaaatgttta actgctaatt caatttattt catagataca    660
atgctgttgg cttgtctgtt tcttcttgaa tgagttttgg tagtctgtgt cttttaagga    720
atttgcccat tttatttaag ttgtctaatt tatgggcata aagtcattta taatgttctc    780
ttattatcct tttaatagat atatcatctg tagtgatttc attttcattc ctgatgttga    840
```

```
taatttgtct taactcccctt tccccctcat tccttatctg tttagtgcct tgcaatttca      900
ttgatctttt aaacgaatta acatttgctt ccactgactt ttcccccgtt acttttatgt      960
ttttacttcc attgattttt tttttctctt ttaatctttt a                         1001
```

<210> SEQ ID NO 3
<211> LENGTH: 601
<212> TYPE: DNA
<213> ORGANISM: Homo sapiens

<400> SEQUENCE: 3

```
caccaccacc cactagacaa attgcttaac ctttctgcac ctcagtttcc tcctgacagg       60
cttgtttaga aaataaaatg agatcaaatt tgtcaagcac agagcattgg ccctggtagg      120
caccacatac atgaatttcc ttcagattgt aggtgaagta gacttgattt gggatttctc      180
ttgttaccta ggtgcttgtg tagaggagac tttagaacca gaatgtgtta tttgtggttt      240
tgagtgtgcc tgggactctg agccaactga attaccaagt aatgggggcc ccatggcatc      300
ycatgacagg tggagagccg gctcttcacc ctggatggac ctgaaatgcc tgctaaggcc      360
ttgctccacc gagtagcaca caccctatca gtttgcccct ctttccatct cttattctag      420
agaccttaaa gcctacttgt tggtatatat tttcaggttt ttggaaattg ggctgtttaa      480
ttgaagttaa taccagtgat gagacttttc aacctgagaa caacctagat gctacttcac      540
attttgcagt ggaagcttac ttccatcttc actcatgtag gacattcttt ggtctcaatg      600
t                                                                     601
```

<210> SEQ ID NO 4
<211> LENGTH: 667
<212> TYPE: DNA
<213> ORGANISM: Homo sapiens

<400> SEQUENCE: 4

```
tgaagcaggg catcagggaa tgggagttgg tgaggaaatt acattaacat ttattgagca       60
ccattctcac tataaacctg aacgtaaata ttattattat tattattatt attattatta     120
ttattattat tattattatt ttagtagaga tgaggccttg ctgtgttgcc tagactggtc      180
ttgaactcct gggctcaagc aatcctctca ccttggcctc tcaaagtgcc tctcaaaggt      240
gtgagccacc atgcccagcc tattcgtttt taatttctga agaaactgag gctaacagct      300
gggtctggcc catgactggt tcagttggta tttggtggac caagttgacc aagctcaccc      360
agcttctgag tgacagagtg aatataaacc cagcctgctc actccatttc ctagttttct      420
cacctctacc agggtctctg ttgctcacaa gagctcaggg ctgggakaag cctctgtgtg      480
acagatgaag gggtcctgct gctctctagg gaagaatcgg tcccaaattg ctcaagggag      540
taaggtggtt tcgttgagga gcatcagcta gggggattga tgggaatagg tgtcaggcag      600
ccagtggaaa ttttgtgtgc ccacctgtgg cacatgtatt atgcaaattc atgcaaaaat      660
atatata                                                               667
```

<210> SEQ ID NO 5
<211> LENGTH: 30
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 5

```
gaaactgagg ctaacagctg ggtctggccc                                    30

<210> SEQ ID NO 6
<211> LENGTH: 30
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 6
agctgatgct cctcaacgaa accaccttac                                    30

<210> SEQ ID NO 7
<211> LENGTH: 30
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 7 ggacccctte atctgtcaca cagaggctcc                                    30

<210> SEQ ID NO 8
<211> LENGTH: 30
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
ctgttgctca caagagctca gggctgggct                                    30

<210> SEQ ID NO 9
<211> LENGTH: 288
<212> TYPE: DNA
<213> ORGANISM: Homo sapiens

<400> SEQUENCE: 9
gaaactgagg ctaacagctg ggtctggccc atgactggtt cagttggtat ttggtggacc    60
aagttgacca agctcaccca gcttctgagt gacagagtga atataaaccc agcctgctca   120
ctccatttcc tagttttctc acctctacca gggtctctgt tgctcacaag agctcagggc   180
tgggakaagc ctctgtgtga cagatgaagg ggtcctgctg ctctctaggg aagaatcggt   240
cccaaattgc tcaagggagt aaggtggttt cgttgaggag catcagct                288
```